United States Patent
Iwasaki et al.

(10) Patent No.: US 6,278,903 B1
(45) Date of Patent: Aug. 21, 2001

(54) WORKING ROBOT FOR HEAT EXCHANGERS AND METHOD OF OPERATING SAID WORKING ROBOT

(75) Inventors: Hisashi Iwasaki, Ube; Shuji Komada, Osaka; Hirotaka Takahashi, Osaka; Minoru Hyuga, Osaka; Takashi Fujimura, Osaka, all of (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 09/468,390

(22) Filed: Dec. 20, 1999

Related U.S. Application Data

(63) Continuation of application No. PCT/JP99/02087, filed on Apr. 19, 1999.

(30) Foreign Application Priority Data

| Apr. 21, 1998 | (JP) | 10-109994 |
|---|---|---|
| Apr. 21, 1998 | (JP) | 10-109996 |
| Apr. 21, 1998 | (JP) | 10-109997 |
| Apr. 21, 1998 | (JP) | 10-109998 |

(51) Int. Cl.$^7$ ................................................ G06F 19/00

(52) U.S. Cl. ................ 700/245; 700/253; 700/255; 700/258; 700/259; 700/260; 700/261; 700/264; 700/900; 219/411; 219/405; 165/5; 165/11.2; 165/76; 165/95

(58) Field of Search .................... 700/245, 264, 700/259–261, 255, 253, 258, 900; 588/2; 165/5, 11.2, 76, 95, 807; 219/411, 405; 422/103, 104, 105, 107, 62–67

(56) References Cited

U.S. PATENT DOCUMENTS

| 4,754,120 | * 6/1988 | Fujimura | 392/422 |
|---|---|---|---|
| 4,971,140 | * 11/1990 | Stoss | 165/5 |

(List continued on next page.)

FOREIGN PATENT DOCUMENTS

0090725 * 10/1983 (EP).

OTHER PUBLICATIONS

Ambrose et al., Robot Models for Space Environments, 1995, IEEE, pp. 213–2118.*

Gecks et al., Robotics–An Efficient Tool for Laboratory Automation, IEEE., pp. 938–944, 1992.*

Matsuda et al., Micro–Step XY–Stage Using Piezoelectric Tube Actuator, IEEE., pp. 137–142, 1991.*

* cited by examiner

Primary Examiner—William A. Cuchlinski, Jr.
Assistant Examiner—McDieunel Marc
(74) Attorney, Agent, or Firm—Reising, Ethington, Barnes, Kisselle, Learman & McCulloch, P.C.

(57) ABSTRACT

A robot body (21) is carried into the water chamber (2A) of a condenser (1) and disposed on a tube sheet (4) through which a number of narrow tubes (3) open. Inner nozzles (23) are inserted into narrow tubes (3) from working devices (24) installed on the front ends of four combined-use arms (22A through 22D) to position and fix the robot body (21). And the arm turning motors (25) and arm extending and contracting cylinder devices (26) of the combined-use arms (22A through 22D) are driven to move the robot body (21). Further, a cleaning brush (12) and a flaw detection probe (13) are inserted into a narrow tube (3) from each working device (24) and moved along the narrow tube (3) by cleaning water, whereby cleaning and inspection are performed. With three of the combined-use arms (22A through 22D) fixed to the narrow tubes (3), the inner nozzle (23) is extracted from the narrow tube (3) and the working device is moved to the next narrow tube (3).

20 Claims, 20 Drawing Sheets

U.S. PATENT DOCUMENTS

| | | | |
|---|---|---|---|
| 5,164,151 | * 11/1992 | Shah et al. | 165/11.2 |
| 5,194,215 | * 3/1993 | Nachbar et al. | 165/11.2 |
| 5,366,896 | * 11/1994 | Margrey et al. | 436/48 |
| 5,710,407 | * 1/1998 | Moore et al. | 219/405 |
| 5,725,664 | * 3/1998 | Nanbu et al. | 118/52 |
| 5,751,610 | * 5/1998 | Gan et al. | 700/85 |
| 5,838,882 | * 11/1998 | Gan et al. | 700/259 |
| 6,170,493 | * 1/2001 | Sivacoe | 165/5 |

清掃水

WORKING ROBOT FOR HEAT EXCHANGERS AND METHOD OF OPERATING SAID WORKING ROBOT

This application is a continuation of PCT/JP99/02087 filed Apr. 19, 1999.

TECHNICAL FIELD

The present invention relates to a working robot for heat exchangers, adapted to effect cleaning or flaw detection test on the many water tubes of a condenser or a heat exchanger which water tubes are connected between and open through the tube sheets of two water chambers, and it also relates to a method of operating said working robot.

TECHNICAL BACKGROUND

As for known working devices for condensers, one is suggested in Japanese Patent Unexamined Publication Heisei 7-229695, which comprises guide rails extending along the surface of the tube sheet in the water chamber, and a working robot adapted to move while being guided along said guide rails. Another is suggested in Japanese Patent Unexamined Laid-open Applications No. 51-10201 and No. 3-199802, in which a robot body having a plurality of legs inserted in the openings in narrow tubes is provided with a working arm, said robot being moved along the tube sheet.

In this connection, although manholes formed in the water chambers of condensers have recently tended to increase in size, conventional manholes are as small as about 500 mm or at most 600 mm in diameter, and it is necessary to carry in components for guide rails and a robot through such manholes. Such conventional robot has its travel mechanism section and working mechanism section separately constructed, so that, though simplified in mechanism, the robot has not a few components and becomes large-sized, making it necessary to disassemble the robot before the latter can be carried into or out of the water chamber through the manhole. Therefore, there has been a problem that the operating time required for assembling and disassembling the robot in the water chamber and carrying it in and out increases.

The present invention is intended to solve said problems and provide a compact working robot for heat exchangers and a method of operating the same.

DISCLOSURE OF THE INVENTION

A working robot for heat exchangers described in Claim 1 comprises a robot body movable along a tube sheet through which a number of narrow tubes open, at least four combined-use arms disposed on the outer periphery of said robot body such that they can be extended and retracted toward and away from the outer periphery along said tube sheet, and a working device installed at the front end of each of said combined-use arms, said working device being provided with a cleaning means consisting essentially of a cleaning tool inserting mechanism for inserting a cleaning tool into a narrow tube and a pressure-feed mechanism for moving said cleaning tool in and along a narrow tube by pressurized fluid, and a positioning mechanism for inserting a connecting and fixing tool into a narrow tube to fix said combined-used arm to the narrow tube to position the robot body, said robot including a movement mechanism for moving the robot body by extending and retracting the combined-use arms fixed by said positioning mechanism.

According to the invention as described in Claim 1, a cleaning operation is effected by the working devices of the combined-use arms upon positioning in which at least three combined-use arms are fixedly connected to the narrow tubes by the positioning mechanisms. Further, the robot body is moved in that the individual combined-use arms are simultaneously driven for extension or retraction. Further, with three combined-use arms fixed to narrow tubes, the remaining combined-use arm is driven, so that the working device is moved from the cleaned narrow tube to the next narrow tube. As compared with the conventional working robot in which the cleaning mechanism and the movement mechanism are separated from each other, therefore, in the present invention the number of members, such as arms, can be reduced, and retraction of the combined-use arms to the robot body makes the robot compact. Thus, carrying into and out of the water chamber is facilitated and the number of preparatory operations, such as assembling and disassembling, is reduced, thereby reducing the operating time.

A working robot for heat exchangers described in Claim 2 comprises a robot body movable along a tube sheet through which a number of narrow tubes open, at least four combined-use arms disposed on the outer periphery of said robot body such that they can be extended and retracted toward and away from the outer periphery along said tube sheet, and a working device installed at the front end of each of said combined-use arms, said working device being provided with a positioning mechanism for inserting a connecting and fixing tool into a narrow tube to fix said combined-used arm to the narrow tube to position the robot body, and a probe inserting mechanism for inserting an inspection probe into a narrow tube and a pressure-feed mechanism for pressure-moving said inserted inspection probe along a narrow tube by pressurized fluid, said robot including a movement mechanism for moving the robot body by extending and retracting the combined-use arms fixed by said positioning mechanism, and a narrow tube inspecting means for inspecting the narrow tube by said inspection probe moved in said narrow tube.

According to the invention as described in Claim 2, when at least three combined-use arms are positioned by being fixedly connected to narrow tubes by the positioning mechanisms, a narrow tube inspecting operation is performed by the working devices. Further, in that the combined-use arms are simultaneously extended or contracted, the robot body is moved, and with three combined-use arms fixed, the working device of the remaining combined-use arm can be moved from a treated narrow tube to the next narrow tube. Therefore, as compared with a conventional working robot in which the movement mechanism of the robot body is separated from the working mechanism for probe insertion inspection and the like, the number of members can be reduced. Further, in that the combined-use arms are retracted toward the robot body, the robot can be made compact. This makes it possible to facilitate carrying into and out of a water chamber, to reduce the number of preparatory operations such as assembling and disassembling and to reduce the operating time.

A working robot for heat exchangers described Claim 3 is characterized in that said working device in Claim 1 is provided with a cleaning means consisting essentially of a cleaning tool inserting mechanism for inserting a cleaning tool into a narrow tube and a pressure-feed mechanism for moving said cleaning tool in and along the narrow tube by pressurized fluid, and a narrow tube inspecting means for inspecting the narrow tube by said inspection probe being moved in said narrow tube.

According to the invention as described in Claim 3, in addition to the functions and effects of Claim 1, insertion and movement of the inspection probe and inspection can be simultaneously effected, ensuring efficient operation.

A working robot for heat exchangers described in Claim 4, characterized in that in any one of Claims 1 through 3, at least three but not all of the at least four combined-use arms have their front ends fixed to narrow tubes by the positioning mechanisms of the working devices, in which state these combined-use arms are driven to move the robot body, and in that the remaining one or more combined-use arms are released from the narrow tubes to move their working devices to the next narrow tubes.

According to the invention as described in Claim 4, four or more combined-use arms and working devices are successively selected and driven such that movement and positioning of the robot body are effected by three combined-use arms and during the positioning, cleaning operation is effected, while the working device of the remaining one or more combined-use arms are moved to the next narrow tube. Therefore, by combining the movement of the robot body and cleaning operation with the movement of the working device in each combined-use arm, cleaning operation can be efficiently effected, greatly reducing the cleaning operation time.

A working robot for heat exchangers described in Claims 5 through 7 is characterized in that in any one of Claims 1 through 3, the base end of each combined-use arm is installed in such a manner as to be able to turn around an axis perpendicular to the tube sheet, and said combined-use arm is configured to be capable of extension and contraction.

According to the invention as described in Claims 5 through 7, since each combined-use arm is installed to be turnable and extendable by the arm turning device and arm extending and contracting device, the construction is extremely simplified and the operation control of the combined-use arm can be easily effected.

A working robot for heat exchangers described in Claim 8 is characterized in that in any one of Claims 5 through 7, the outer periphery of the robot body is formed with storage spaces for receiving the combined-use arms such that when the combined-use arms are retracted for contraction and received in the storage spaces, the entire robot assumes a cylindrical form which enables the robot to pass through a manhole.

According to the invention as described in Claim 8, when the combined-use arms are in the retracted stored position, the entire robot assumes a cylindrical form with the center at the robot axis, whereby the robot can be easily carried into and out of the water chamber through a narrow round manhole without disassembling the robot, and the operating time for preparation for assembling in the water chamber and for disassembling and withdrawal can be greatly reduced.

A working robot for heat exchangers described in Claim 9 is characterized in that in Claim 3, the working device is provided with an insertion guide body for supporting the inspection probe and connecting and fixing tool for movement toward a push-in nozzle opposed to a narrow tube, said insertion guide body being adapted for movement between a push-in position on the axis of said push-in nozzle and a standby position shifted from said push-in position, wherein the cleaning tool inserting means and probe inserting means are provided with a push-in driving device, and when the insertion guide body is moved to the standby position, the cleaning tool inserted in the push-in position is inserted into a narrow tube through said push-in nozzle, and the inspection probe and connecting and fixing tool are inserted into the narrow tube through said push-in nozzle from the insertion guide body moved from the standby position to the push-in position.

According to the invention described in Claim 9, since an insertion guide body for supporting the inspection probe and connecting and fixing tool is installed such that it is movable between the push-in position and the standby position, the cleaning tool and inspection probe and the connecting and fixing tool can be pushed into a narrow tube in two steps, so that the stroke of the push-in driving device can be shortened and the working device can be made compact.

A working robot for heat exchangers described in Claim 10 is characterized in that in any one of Claims 1 through 3, the positioning mechanism for the working device is provided with a push-in driving device for inserting the connecting and fixing tool into a narrow tube, said connecting and fixing tool being provided with an inner sleeve member disposed on the front end side, a binding ring assembly fitted on said inner sleeve member and prevented from slipping off at the front end, a push-in sleeve slidably fitted on the base end of the binding ring assembly in the inner sleeve member and adapted to be driven for extension and retraction by said push-in driving device, and a locking member for preventing the insertion of the inner sleeve member at the position where said binding ring assembly has been inserted into a narrow tube, said binding ring assembly comprising alternating elastic rings and spacer rings, said working robot being thus configured such that with the insertion of the inner sleeve member into a narrow tube being prevented by said locking member, the push-in driving device drives the push-in sleeve toward the front end to compress said binding ring assembly, and the connecting and fixing tool is fixed in the narrow tube by the expansion of the elastic rings.

According to the invention as described in Claim 10, since, in the connecting and fixing tool, the binding ring assembly comprising alternating elastic rings and spacer rings is compressed and fixed in position, the compressed elastic rings are expanded toward the outer periphery to enter the spaces between the spacer rings and the inner tube, producing a wedge action which makes it possible to firmly fix the working device to the narrow tube. Further, by canceling the compression, the fixing can be reliably cancelled, whereby rapid movement and positioning of the robot are possible.

A working robot for heat exchangers as set forth in Claim 11 is characterized in that in Claim 1 or 3, the robot body is provided with a cleaning tool distributing device for delivering cleaning tools successively to the working positions of the combined-use arms, said cleaning tool distributing device being provided with a supplying arm device which moves said cleaning tool holder between a supplying position where said cleaning tools are fed in and a distributing position where said cleaning tools are delivered to the working devices of the combined-use arms as a revolving arm having the cleaning tool holder at the front end is turned around the robot axis, which is perpendicular to the tube sheet.

According to the invention as described in Claim 11, cleaning tools fed to the robot body are distributed to the working devices from respective brush distributing positions by the supplying arm device of the brush distributing device through a revolving arm rotated around the robot axis; therefore, as compared with an arrangement in which cleaning tools are fed directly to the working devices, the robot can be made small in size and compact.

A working robot for heat exchangers described in Claims 12 and 13 is characterized in that in Claim 2 or 3, the robot includes the probe returning mechanisms for returning the inspection probe to the working device after the inspection probe has been moved through the narrow tube, and narrow tube inspecting mechanisms for inspecting the narrow tube when the inspection probe is moving along at least one of the forward and return paths.

According to the invention as described in Claims 12 or 13, with the aid of the probe inserting mechanism and the probe returning mechanism, inspection of a narrow tube can be conducted by the inspection probe when the latter is moving in the narrow tube which has just been cleaned; therefore, the inspection data on the narrow tube which has just been cleaned can be obtained in real time, greatly improving the operating efficiency.

A working robot for heat exchangers described in Claim 14 is characterized in that in Claim 12 or 13, the probe inserting mechanism is arranged to pressure-feed the inspection probe together with and behind the cleaning tool by means of pressurized fluid from the pressure-feed mechanism, and the probe returning mechanism is constituted by a code reel device capable of winding and paying out the inspection cable connected to inspection probe, said code reel device being provided with a take-up reel for each inspection probe of the working device for spirally winding the inspection cable.

According to the invention as described in Claim 14, since the inspection probe is pressure-fed behind and together with the cleaning tool, the pressure-feed mechanism can be used as a cleaning means, making it possible to make the working devices compact in size. Further, since the inspection cables are spirally wound on the respective thin take-up reels, the thickness (height) of the cord reel device can be reduced and hence the robot body can be made compact. Further, the inspection cables can be reliably wound or paid out and the paid-out amount of the inspection cable (the position of the inspection probe) can be correctly found from the angle of rotation of the take-up reel; thus, the inspection using the inspection probe can be smoothly conducted.

A method of operating a working robot for heat exchangers described in Claim 15 is characterized in that the robot body is movably disposed on a horizontal tube sheet through which a number of narrow tubes open, and the robot body is provided with four combined-use arms installed to be able to extend and contract and turn at their base ends around their respective axes perpendicular to the tube sheet, and in that in the state in which the robot body is positioned in such a manner that all or three of these four combined-use arms have their connecting and fixing tools inserted into narrow tubes from their working devices at their front ends and fixed therein, out of eight drive systems consisting essentially of the arm extending and contracting devices and arm turning devices of the four combined-use arms fixed to said narrow tubes, or out of six drive systems consisting essentially of the arm extending and contracting devices and arm turning devices of the three combined-use arms, at least three but not all are drive-controlled, and in the state in which the remaining one or more drive systems are rendered free to be capable of following said drive-controlled drive systems, the robot body is positioned and fixed, and moved along the tube sheet.

According the invention as described in Claim 15, out of the eight or six drive systems of four or three combined-use arms, at least three but not all are drive-controlled, whereby the positioning, fixing and moving of the robot body can be effected without overloading the narrow tubes, preventing failure or damage in or to the narrow tubes and the robot.

A method of operating a working robot for heat exchangers described in Claim 16 is characterized in that the robot body is movably disposed on an inclined or vertical tube sheet through which a number of narrow tubes open, the robot body is provided with four combined-use arm installed to be able to extend and contract and turn at their base ends around their respective axes perpendicular to the tube sheet, and in that in the state in which the robot body is positioned in such a manner that all or three of these four combined-use arms have their connecting and fixing tools inserted into narrow tubes from their working devices at their front ends and fixed therein, out of eight drive systems consisting essentially of the arm extending and contracting devices and arm turning devices of the four combined-use arms, or out of six drive systems consisting essentially of the arm extending and contracting devices and arm turning devices of the three combined-use arms, two drive systems that are the arm extending and contracting device and the arm turning motor of that combined-use arm whose front end is positioned in the uppermost region are respectively drive-controlled, while at least one of the other drive systems of the combined-use arms is drive-controlled, and the remaining drive system or systems are rendered free to be capable of following said drive-controlled drive systems.

According to the invention as described in Claim 16, in the case of a substantially vertically disposed tube sheet, the two drive systems of the combined-use arm whose front end is positioned in the uppermost region are respectively drive-controlled while at least one drive system of the other combined-use arms is drive-controlled, whereby the robot body can be accurately positioned and fixed on the inclined or vertical tube sheet without overloading the narrow tubes, preventing failure or damage in or to the narrow tubes and the robot.

A method of operating a working robot for heat exchangers described in Claim 17 is characterized in that in Claim 16, in the combined-use arms except the one whose front end is positioned in the uppermost region and whose drive systems are drive-controlled, median lines are drawn from the connecting and fixing tool on the front end of the uppermost combined-use arm through the centers of turning movement of the other combined-use arms, and in the case where a combined-use arm to be drive-controlled is present in a predetermined range of angle on either side of the median lines from these centers of turning movement, the arm turning device of said combined-use arm is drive-controlled while the arm extending and contracting device is rendered free to be capable of following the drive system which is drive-controlled, or in the case where a combined-use arm to be drive-controlled is present outside said predetermined range of angle on either side of the median lines from these centers of turning movement, the arm turning device is rendered free to be capable of following the drive system which is drive-controlled.

According to the invention as described in Claim 17, when the robot body is to be positioned, held and moved, on the basis of the positions of other combined-use arms than the one disposed in the uppermost region, and of the arm extending and contracting devices and arm turning devices of these combined-use arms, those which are located on the side where the moment around the front end of the uppermost combined-use arm can be more easily supported are selected and drive-controlled; therefore, the robot body can be correctly positioned, held and moved with a low power.

A method of operating a working robot for heat exchangers described in Claim 18 is characterized in that the robot body is movably disposed on a tube sheet through which a number of narrow tubes open, the robot body is provided with four combined-use arms installed such that they can be extended and contracted and can be turned at their base ends around their respective axes perpendicular to the tube sheet, three of these four combined-use arms insert connecting and fixing tools into narrow tubes from working devices at the front ends of the combined-use arms and are fixed in position, thereby positioning the robot body, in this state, the remaining combined-use arm is moved and the working devices are stopped at positions where they are opposed to narrow tubes, and both drive systems respectively consisting essentially of an arm extending and contracting device for extending and contracting the combined-use arm and an arm turning device for turning the combined-use arm are temporarily rendered free to be capable of following the load, whereupon the first insertion member is inserted into the narrow tube from the working device.

According to the arrangement as described in Claim 18, even if the working device of a combined-use arm which is moved is deviated with respect to the narrow tube, such positional deviation can be accommodated in that the two drive systems of said combined-use arm are rendered free. Thus, the first insert member can be smoothly inserted into a narrow tube, whereby the working device is positioned, ensuring smooth insertion of the following insert members into the narrow tube.

A method of operating a working robot for heat exchangers described in Claim 19 is characterized in that the robot body is movably disposed on a tube sheet through which a number of narrow tubes open, at least three of the four combined-use arms installed on the robot body such that they can be extended and contracted and can be turned at their base ends around their respective axes perpendicular to the tube sheet have their connecting and fixing tools inserted into narrow tubes from the working devices on their respective front ends through push-in nozzles and are fixed therein, thereby positioning the robot body, a working reference position of the robot body is set at a position spaced a predetermined distance from the tube sheet by push-in driving devices installed on the combined-use arms such that said working devices can be extended and contracted with respect to the tube sheet, when the working device of one combined-use arm is released from a treated narrow tube and moved to and positioned at the next narrow tube, the pressing and driving devices of the other three combined-use arms are driven to move the robot body until it is close to the tube sheet, thereby correcting the displacement in an amount by which the portion of the robot body associated with the combined-use arm is spaced from the tube sheet by the release of the connecting and fixing tool of this combined-use arm in order for bringing the push-in nozzle of this combined-use arm close to the narrow tube, and after a cleaning brush and the connecting and fixing tool are inserted into the narrow tube from the working device of this combined-use arm through the push-in nozzle to fix this combined-use arm to the narrow tube, the pressing and driving devices of all combined-use arms are driven to retract the robot body to said working reference position.

According to the arrangement as described in Claim 19, when the connecting and fixing tool is extracted from the narrow tube, it sometimes happens that the portion of the robot body associated with this combined-use arm is moved further away from the tube sheet as a reaction so that the push-in nozzle no longer approaches the next narrow tube in the position where it is opposed to said narrow tube, making it difficult to insert a cleaning tool or the connecting and fixing tool. However, by driving the pressing and driving device of the remaining combined-use arms to make the robot body approach the narrow tube, the push-in nozzles of the combined-use arms which is moved can be positively made to approach the narrow tube, ensuring smooth insertion of cleaning tools and the connecting fixing tools.

A method of operating a working robot for heat exchangers described in Claim 20 is characterized in that the robot body is movably disposed on a tube sheet through which a number of narrow tubes open, at least three of the four combined-use arms installed on the robot body to be extendable and contractible and turnable have their connecting and fixing tools inserted into and fixed in narrow tubes from working devices on their respective front ends through push-in nozzles, thereby positioning the robot body, a working reference position of the robot body is set at a position closest to the tube sheet by push-in driving devices installed on the combined-use arms such that said working devices can be extended and contracted with respect to the tube sheet, the limit of projection to which the push-in nozzle is projected by the pressing and driving device being such that the limit position is spaced a predetermined distance from the working reference position toward the narrow tubes, when the working device of one combined-use arm is released from a treated narrow tube and moved to and positioned at the next narrow tube, the pressing and driving device of this combined-use arm is driven to move the push-in nozzle to the limit of projection close to the narrow tube, thereby correcting the amount by which the portion of the robot body associated with the combined-use arm is displaced from the tube sheet by the release of the connecting and fixing tool of the combined-use arm in order for bringing the push-in nozzle to the narrow tube, and after the connecting and fixing tool has been fixed in the narrow tube by being inserted thereinto from the working device through the push-in nozzle, the pressing and driving device of said combined-use arm is driven to retract the robot body to said working reference position.

According to the arrangement as described in Claim 20, the same effects as in Claim 18 can be attained by setting the working reference position of the robot at a position closest to the tube sheet and setting the stroke of each push-in driving device for closer approach to the tube sheet.

BEST MODE FOR EMBODYING THE INVENTION

The invention will now be described in more detail with reference to the attached drawings.

Figure 1:
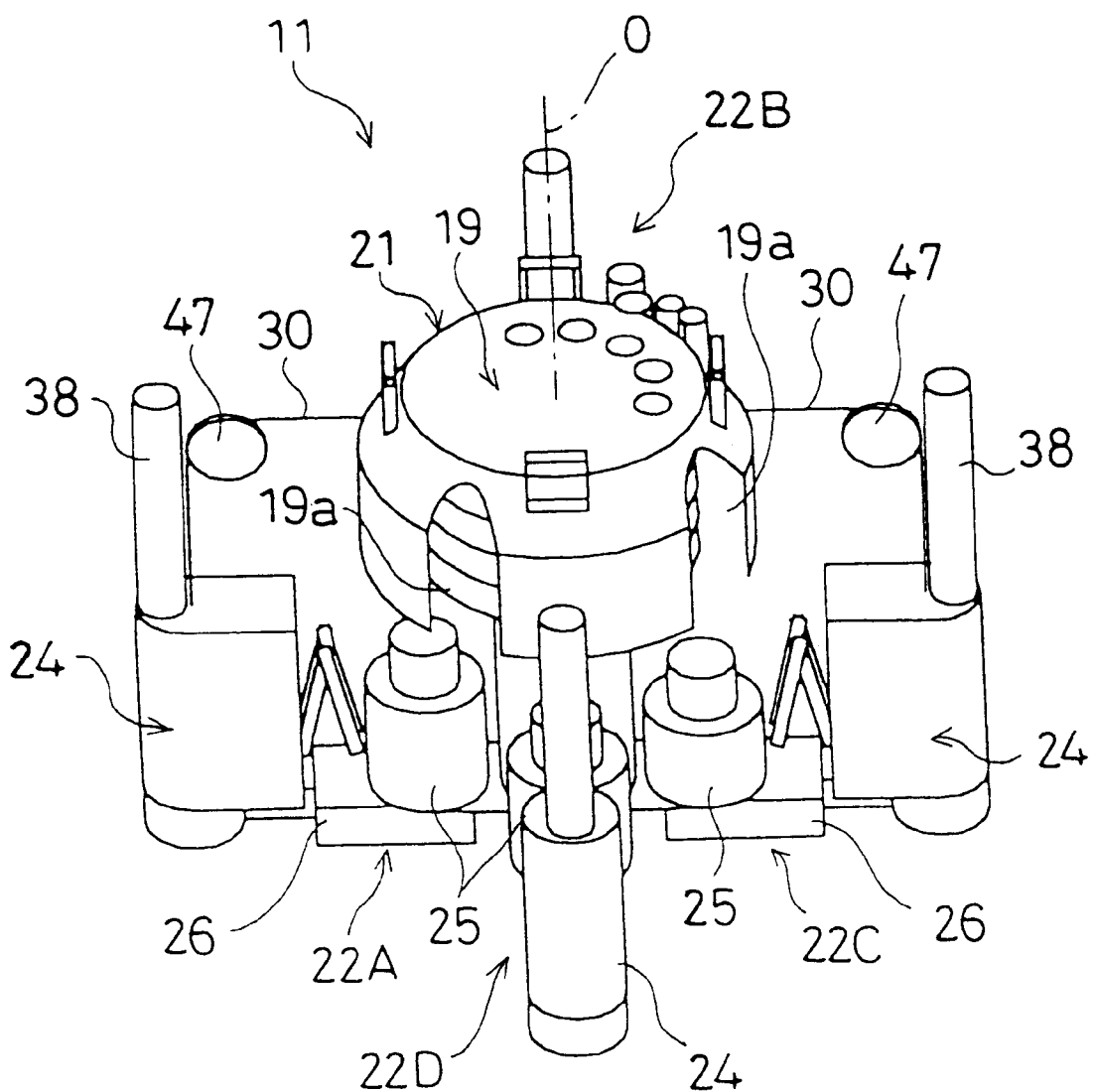
FIG. 1 is a perspective view showing a cleaning and inspecting robot at work according to the present invention.
Figure 2:
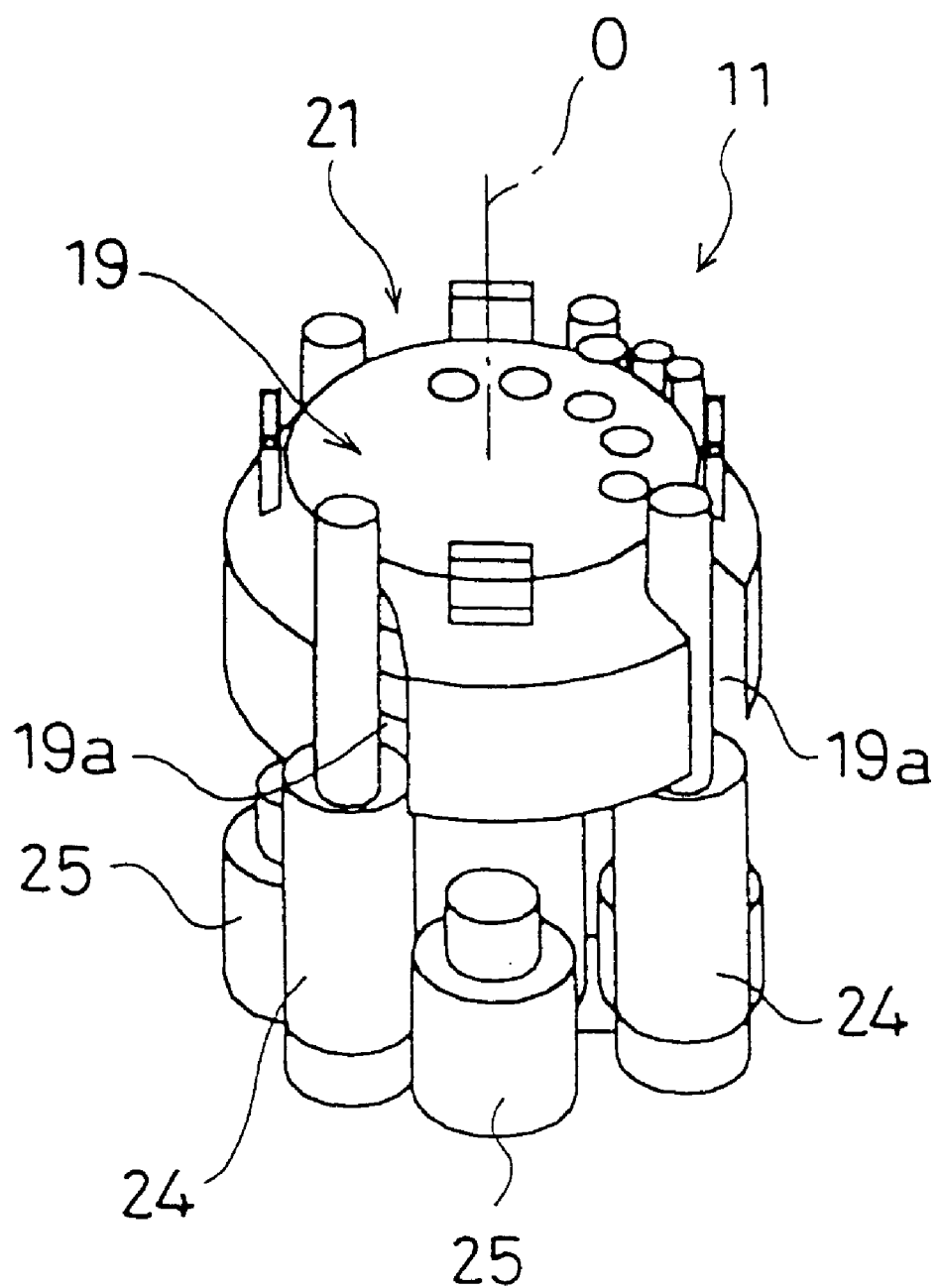
FIG. 2 is a perspective view showing the cleaning and inspecting robot in the stored state.
Figure 3:
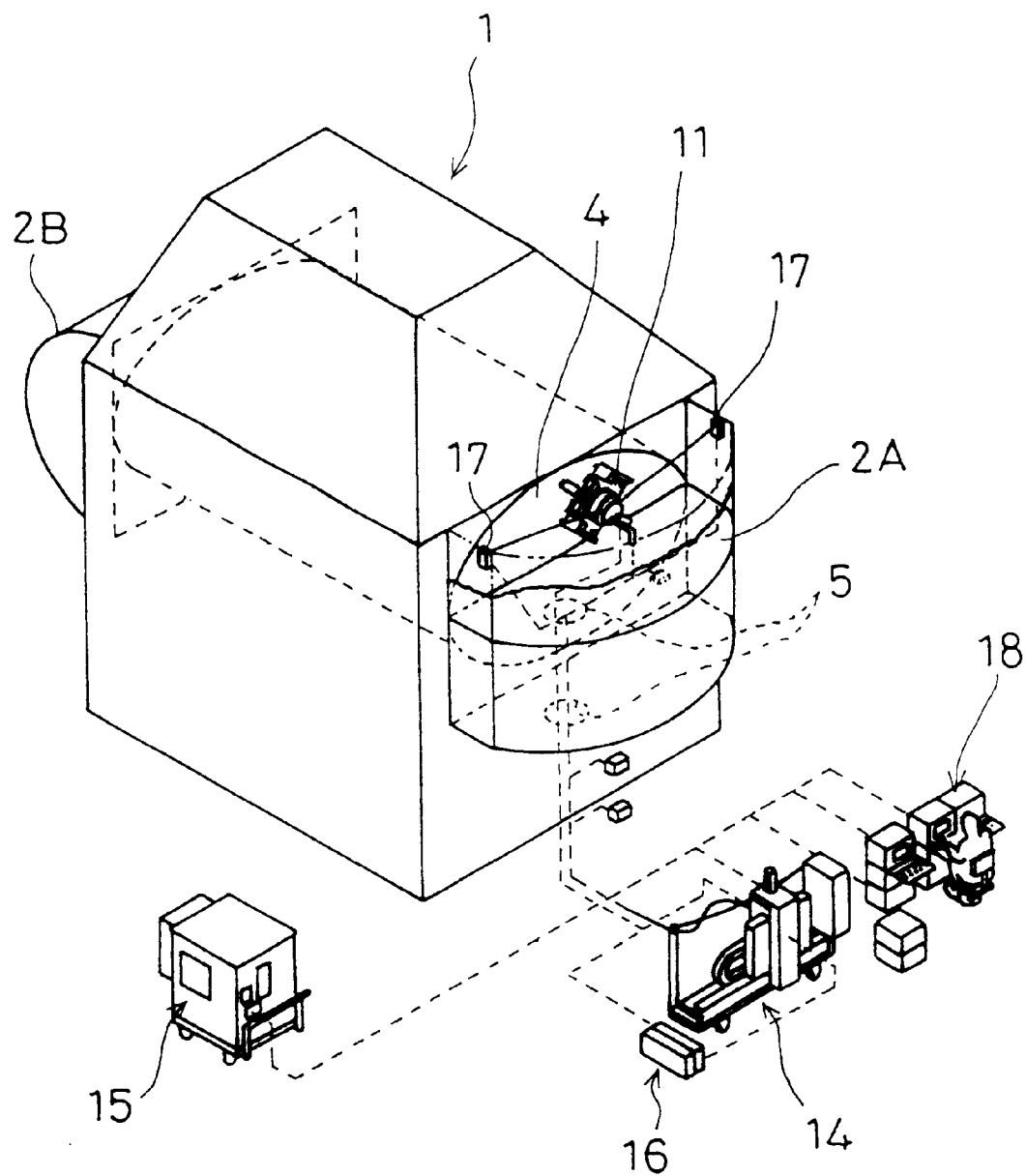
FIG. 3 is a complete perspective view showing the cleaning and inspecting robot and support equipment.
Figure 4:
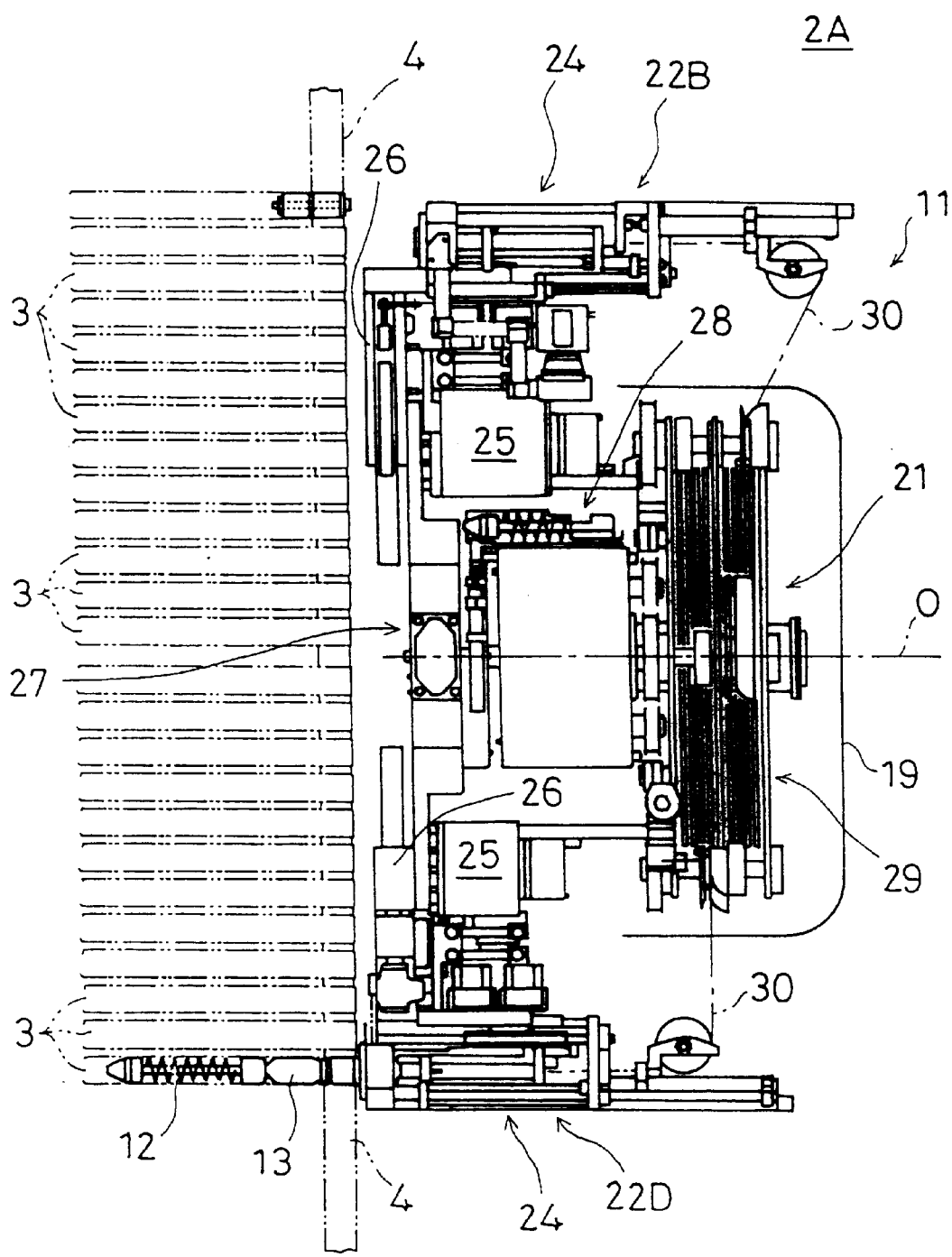
FIG. 4 is a complete side view, in section, of the cleaning and inspecting robot.

In FIGS. 1 through 5, a condenser 1 installed for example in a power station or the like has a number of narrow tubes 3 extending from one water chamber 2A to the other water chamber 2B to allow cooling water to flow therethrough, as shown in FIGS. 3 and 4. Since seawater is normally used as the cooling water for this condenser 1, it is necessary to regularly clean the narrow tubes 3 and inspect for damage such as cracks. A cleaning and inspecting robot (hereinafter referred to simply as the robot) 11 is used to clean and inspect these narrow tubes 3 and is so arranged that while self-advancing along a tube sheet 4 through which said many narrow tubes 3 open, the robot inserts a cleaning brush 12, which is a cleaning tool, into a narrow tube 3 and moves the brush 12 by cleaning water, which is a pressurized fluid, to clean the narrow tube 3. Further, a flaw detection probe 13, which is an inspection probe, is inserted behind the clearing brush 12 and is moved together with the cleaning brush 12 by said cleaning water, so that a flaw detection test on the narrow tube 3 can be conducted by the flaw detection probe 13.

(Support Equipment)

Further, there is provided support equipment for this robot 11, as shown in FIG. 3, which comprises a brush supplying device 14 for feeding a cleaning brush 12 to the robot 11, a hydraulic unit 15 for feeding pressurized oil, which is a drive source, to the robot 11, a water feed pump unit 16 for feeding cleaning water, which serves as a movement source for the cleaning brush 12 and the like, a fall-preventing devices 17 for preventing the robot 11 from falling off the tube sheet 4, and a control device 18 for controlling the robot 11 and such support equipment parts and storing test data on the narrow tube from detection signals from the flaw detection probe 13.

Figure 5:
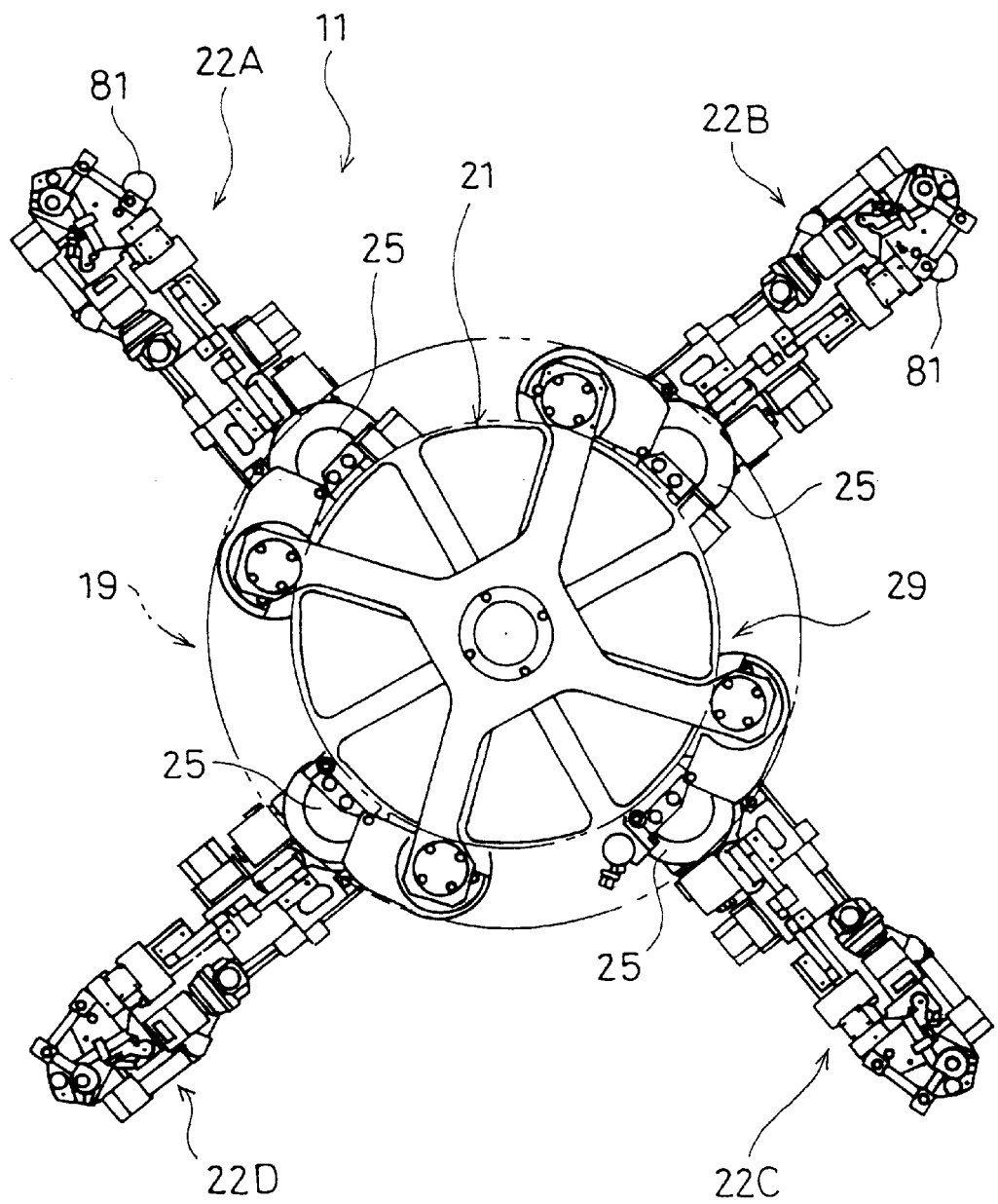
FIG. 5 is a complete rear view with a cover omitted.

The robot body 21 of this robot 11, as shown in FIG. 5, is provided on its outer periphery with four, i.e., the first through fourth, combined-use arms 22A through 22D for both moving and working purposes, which are capable of extension and retraction, said first through fourth combined-used arms 22A through 22D each having a working device 24 mounted on the front end thereof. These working devices 24 comprise positioning mechanisms for inserting inner nozzles 23, which are connecting and fixing tools, into predetermined narrow tubes 3 to fix the front ends of the first through fourth combined-use arms 22A through 22D to the narrow tubes 3 (more or less turning movement allowed), cleaning tool inserting mechanisms for inserting cleaning brushes 12 into narrow tubes 3, probe inserting mechanisms for inserting flaw detection probes 13 behind the cleaning brushes 12, and pressure-feed mechanisms for pressure-feeding the cleaning brushes 12 and flaw detection probes 13 through the narrow tubes 3 by means of cleaning water. Further, the robot body 21 is provided with probe returning mechanisms for retracting the flaw detection probe 13 through the narrow tube 3 with the aid of an inspection cable 30, narrow tube inspection mechanisms for inspecting the narrow tubes 3 for cracks or the like through the flaw detection probes 13 moved within the narrow tubes 3, and movement mechanisms for extending and retracting the first through fourth combined-use arms 22A through 22D fixed by said positioning mechanisms so as to move the robot body 21. And said cleaning tool inserting mechanisms and said pressure-feed mechanisms constitute cleaning means, while said probe inserting mechanisms, pressure-feed mechanisms, probe returning mechanisms and narrow tube inspection mechanisms constitute probe insertion and inspection means.

Figure 15:
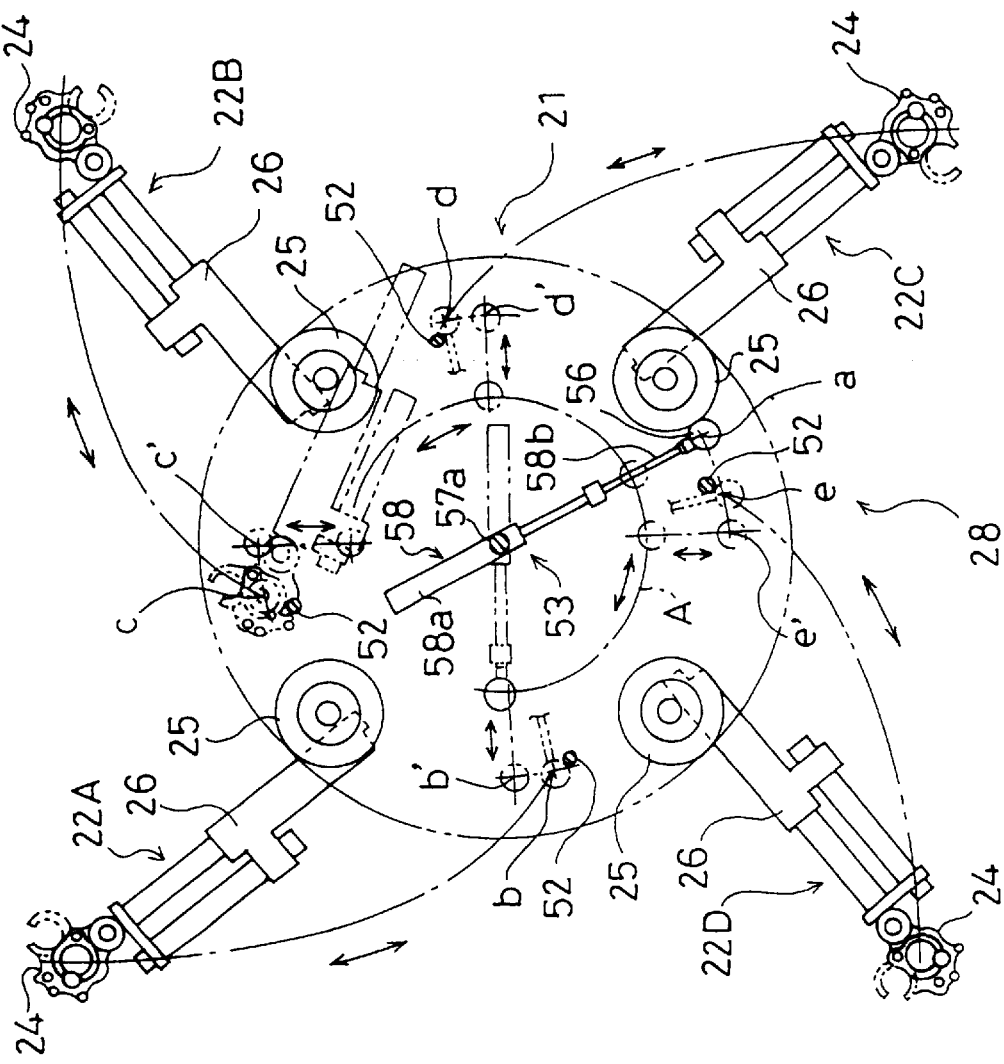
FIG. 15 is a cross sectional view showing a brush distributing device.
Figure 16:
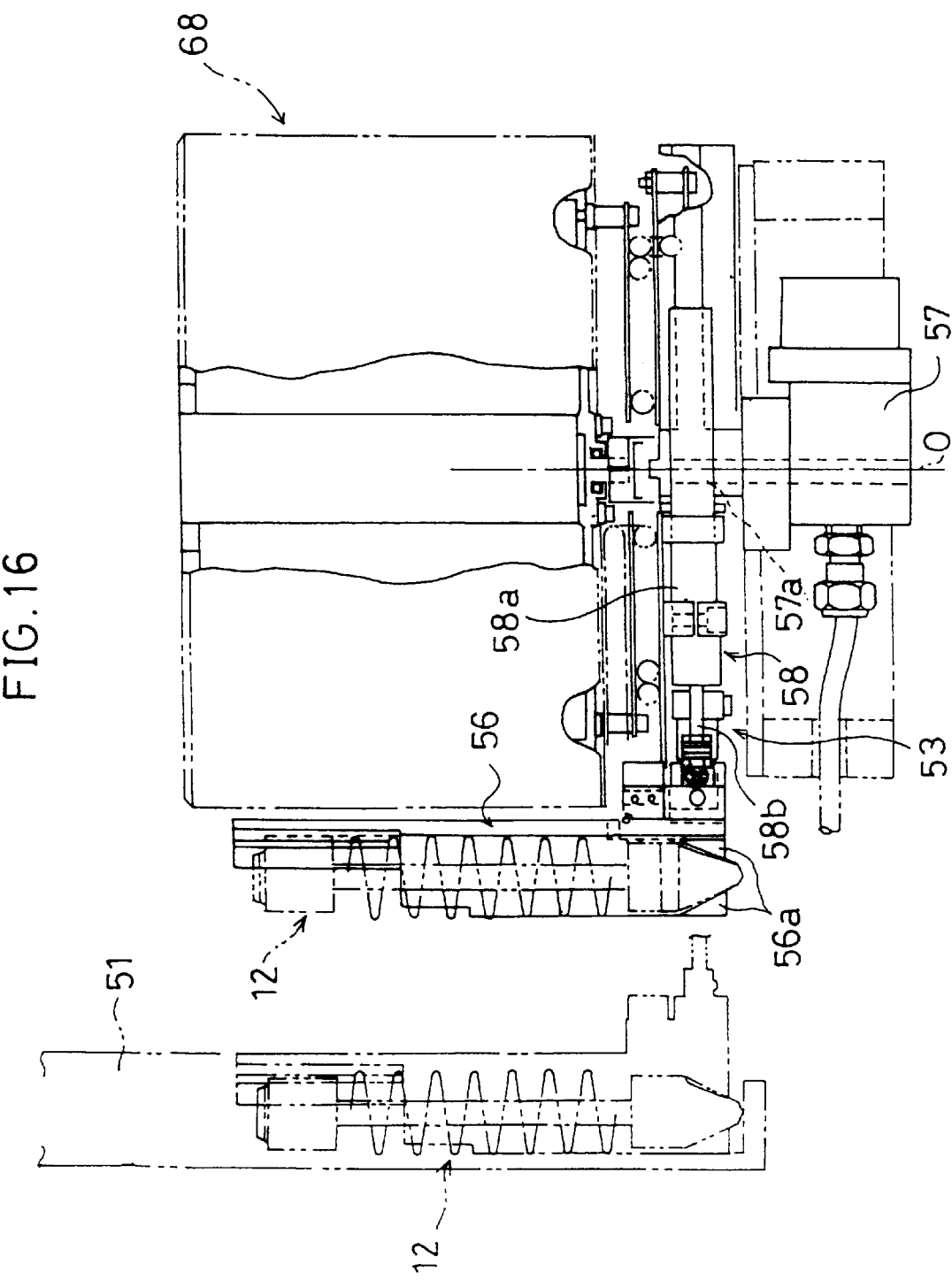
FIG. 16 is a side view, in cross section, showing the brush distributing device.
Figure 17:
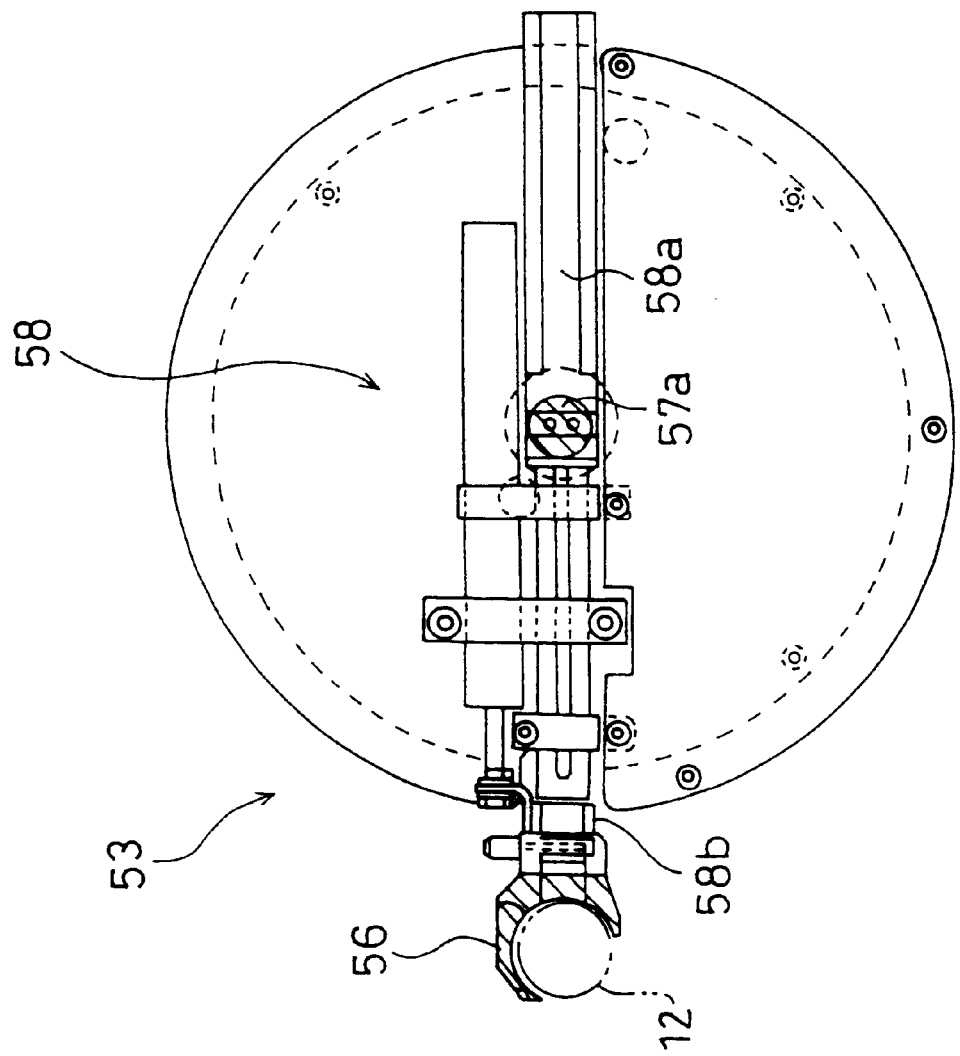
FIG. 17 is a cross sectional view showing a supplying arm device.

Further, these first through fourth combined-use arms 22A through 22D have their respective base ends mounted at positions spaced 90° from each other on the front of the robot body 21 for turning around axes which are parallel with the robot axis O which is perpendicular to the tube sheet 4. That is, the robot body 21 is provided with arm turning motors 25 of the hydraulic type which are arm turning devices at positions spaced 90° from each other, and the first through fourth combined-use arms 22A through 22D are turned within a predetermined range by these arm turning motors 25. Further, the first through fourth combined-use arms 22A through 22D each have housed therein an arm extending and contracting cylinder device 26, which is an arm extending and contracting device. And these arm turning motors 25 and arm extending and contracting cylinder devices 26 cause the working devices 24 disposed at the front ends of the first through fourth combined-use arms 22A through 22D to move back and forth between storage positions (the same as brush distribution positions b through e in FIG. 15) retracted close to the robot body 21, and working positions opposed to the selected narrow tubes 3 with the arms extended toward the outer periphery. (See FIG. 15.)

Further, the robot body 21 is provided on the front with an arm holder 27 having the arm drive motors 25, a brush distributing device 28 for feeding cleaning brushes to the working devices 24 of the first through fourth combined-use arms 22A through 22D, a code reel device 29 which constitutes the probe returning mechanisms for winding the inspection cables 30 of the flaw detection probes 13. The numeral 19 denotes a cover for covering the robot body 21.

And with the inner nozzles 23 inserted and fixed in the narrow tubes 3 by the positioning mechanisms, the arm turning motors 25 and arm extending and contracting cylinder devices 26 for the first through fourth combined-use arms 22A through 22D constituting said movement mechanisms are driven, whereby the robot body 21 is moved to a target position along the tube sheet 4. While three of the first through fourth combined-use arms 22A through 22D, e.g., the first, third and fourth combined-use arms 22A, 22C and 22D are fixed to narrow tubes 3 for cleaning and inspection, the remaining second combined-use arm 22B is released from the narrow tube 3 and receives a cleaning brush 12 from the brush distributing device 28, whereupon it is moved to the next narrow tube 3.

Further, the robot body 21 and cover 19, as shown in FIGS. 1 and 2, are formed with storage spaces 19a for receiving the working devices 24 at the storage positions where the first through fourth combined-use arms 22A through 22D are contracted and retracted. As shown in FIG. 2, it is arranged that at these storage positions, the robot 11 assumes a cylindrical form with the center at the robot axis O. Thereby, the diameter of the robot 11 in its stored state is smaller than that of the manhole 5 of the water chamber 2A (FIG. 3) to allow the robot 11 to pass therethrough, so that the robot 11 can be carried into and out of the water chamber 2A via the narrow manhole 5 without disassembling the robot 11. Thus, the robot 11 assuming a cylindrical form greatly reduces the preparation time spent in the water chamber 2A and the withdrawal time.

(First Through Fourth Combined-Use Arms 22A Through 22D)

Figure 6:
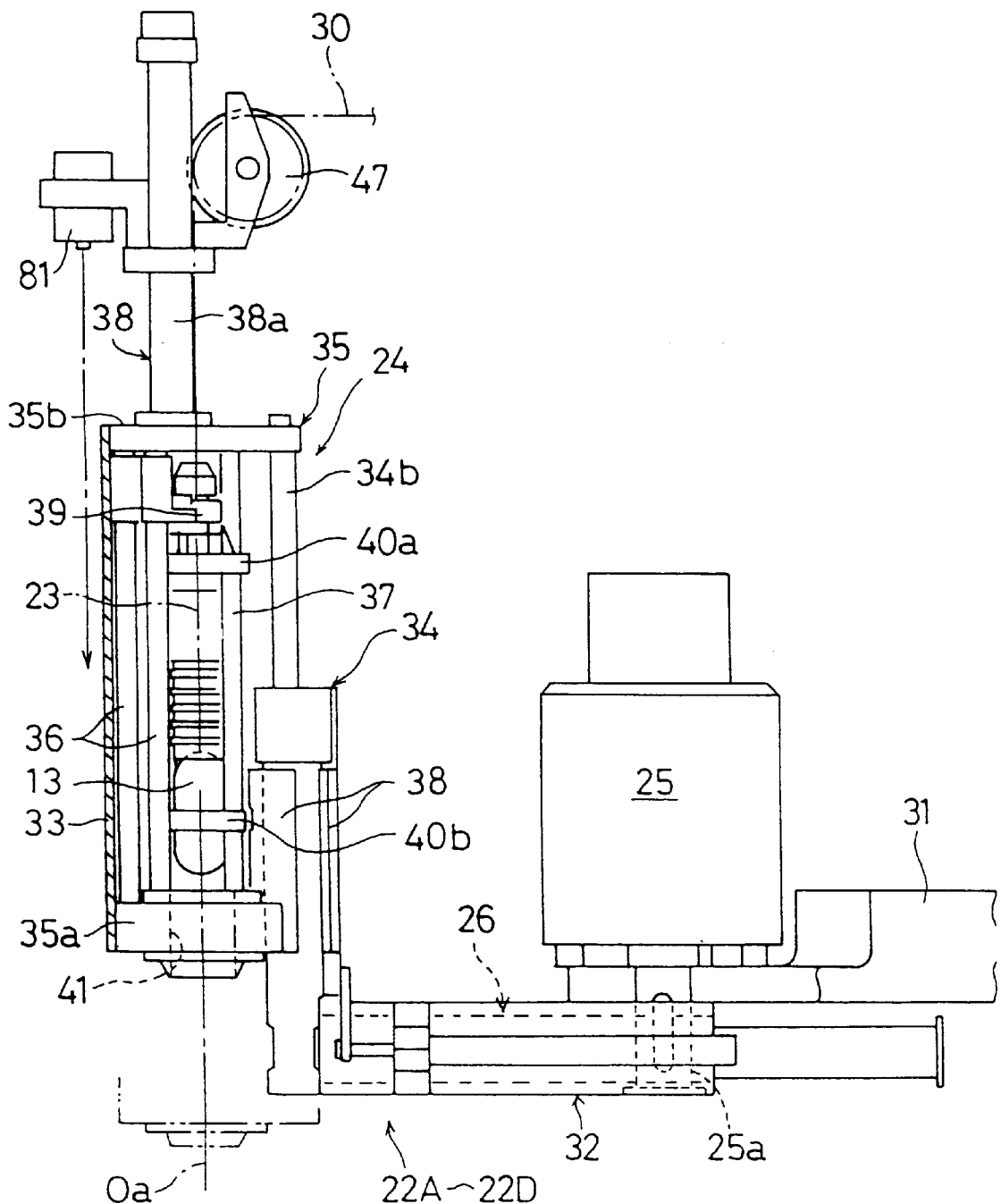
FIG. 6 is a side view showing a combined-use arm and a working device.
Figure 7:
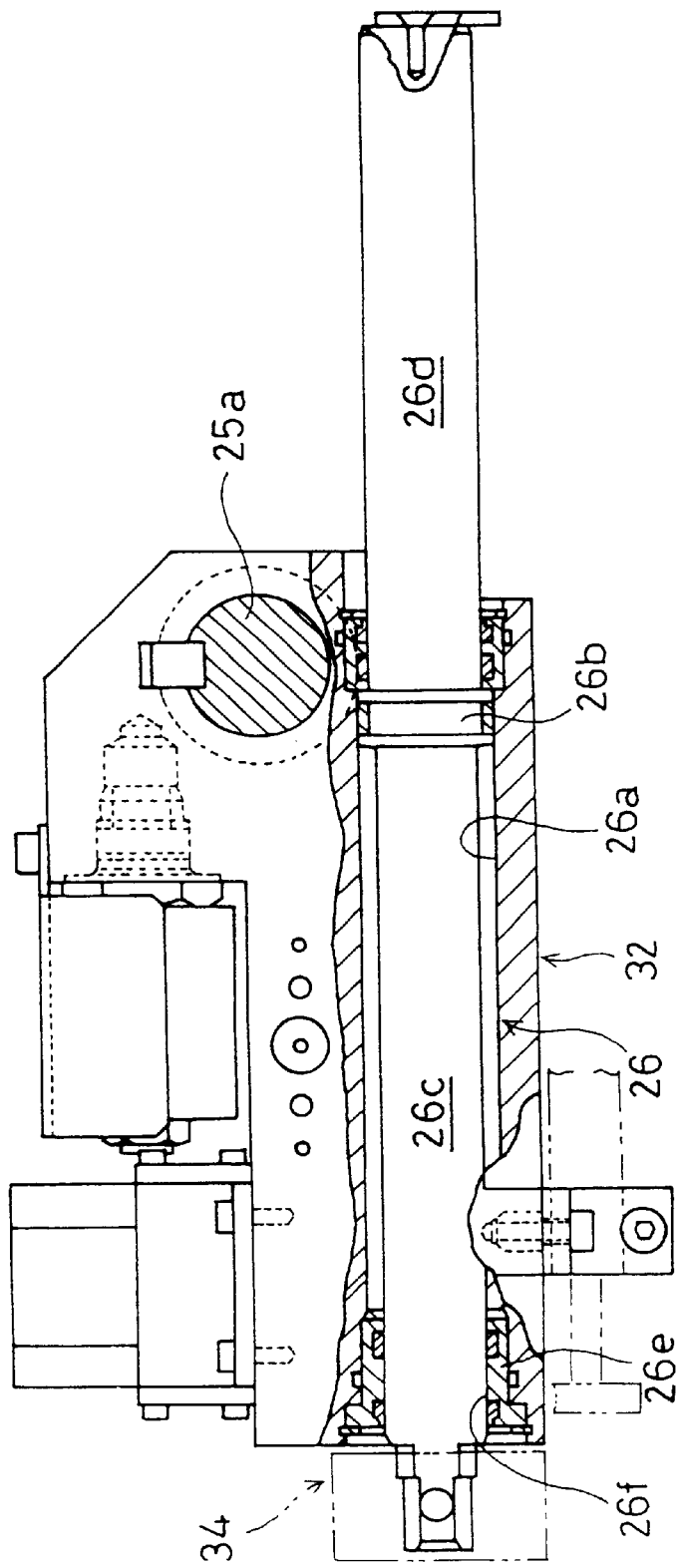
FIG. 7 is a sectional view showing the combined-use arm and an arm extending and contracting cylinder device.
Figure 8:
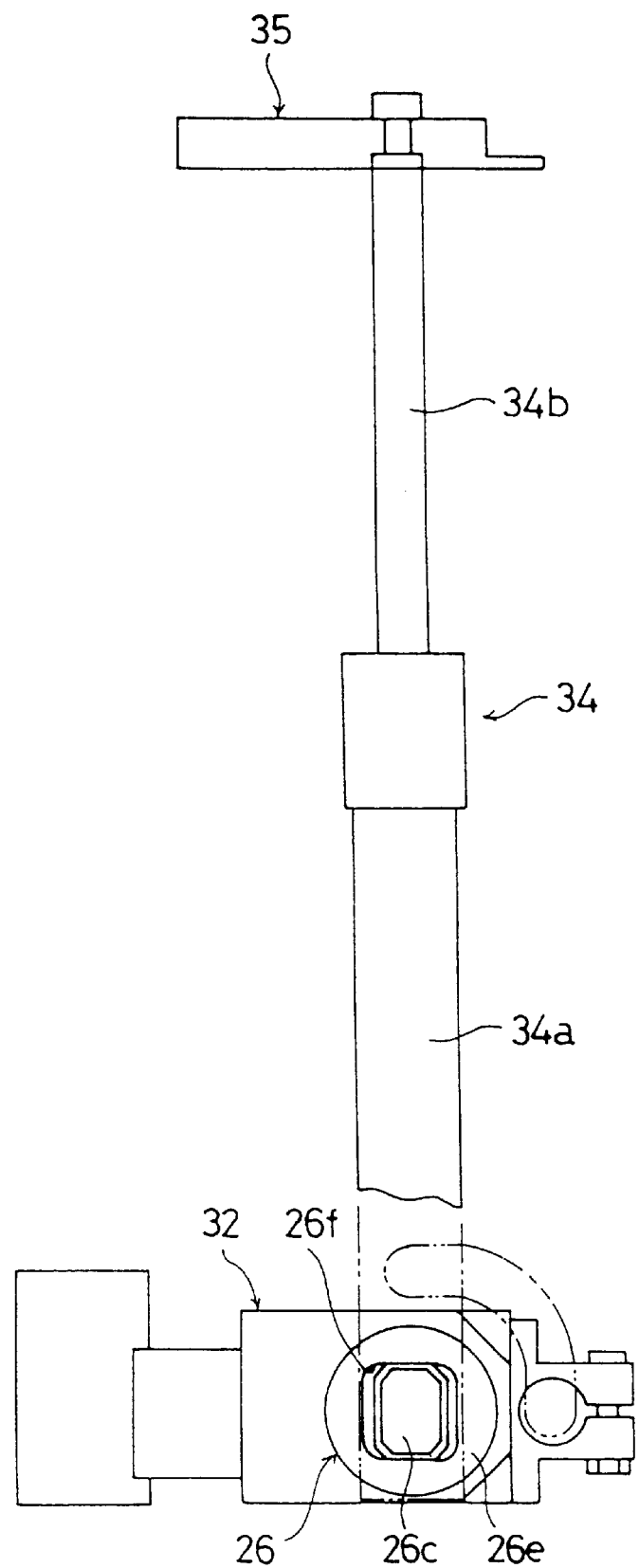
FIG. 8 is a front view showing the arm extending and contracting cylinder device and pressing cylinder device of the combined-use arm.
Figure 9:
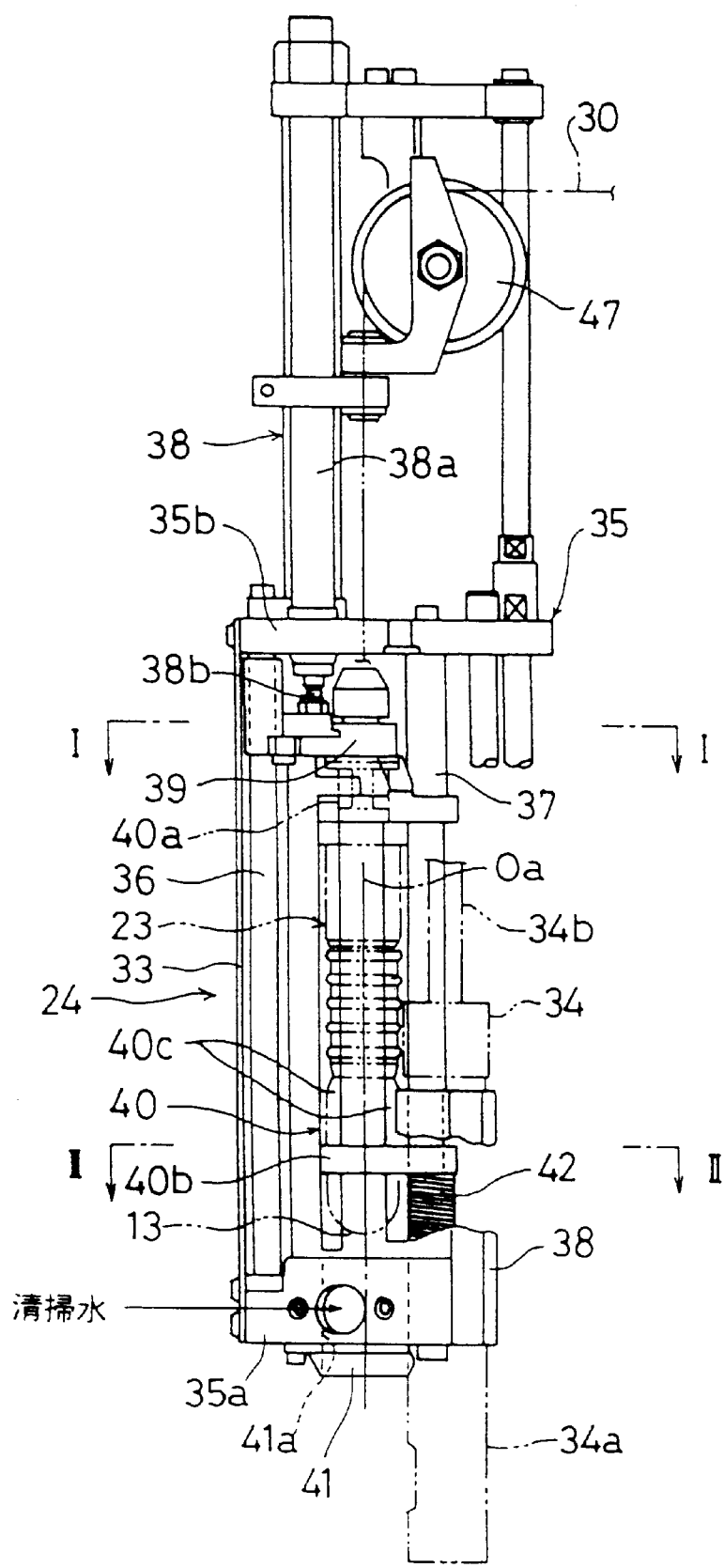
FIG. 9 is a side view showing the working device.
Figure 10:
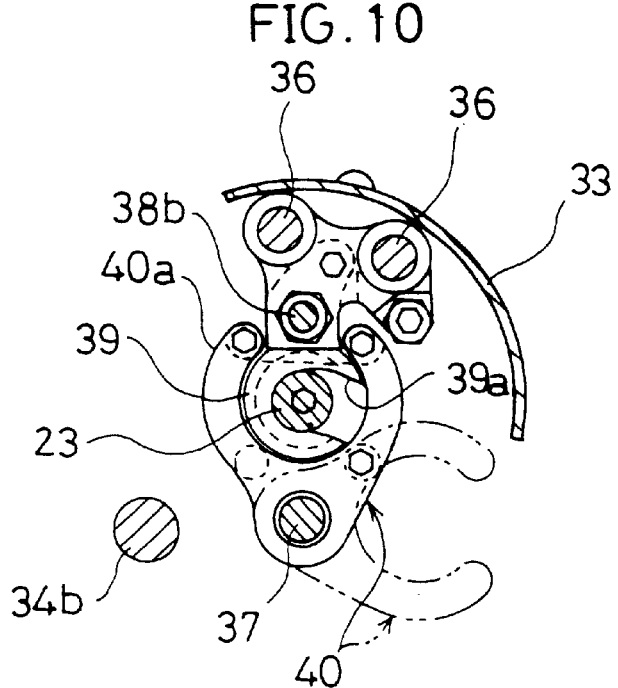
FIG. 10 is a sectional view taken along the line I—I in FIG. 9.
Figure 11:
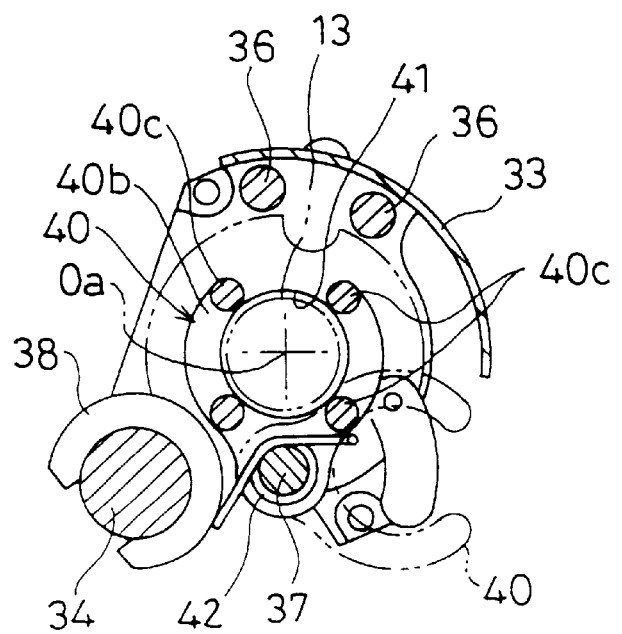
FIG. 11 is a sectional view taken along lines II—II in FIG. 9.

First, the first through fourth combined-use arms 22A through 22D will be described with reference to FIGS. 6 through 14. As shown in FIGS. 6 through 8, the first through fourth combined-use arms 22A through 22D are of the same arrangement. And the four arm turning motors 25 are mounted on the front frame 31 of the arm holder 27 at angular intervals of 90 degrees. And an arm cylinder frame 32 is attached to the output shaft 25a of the arm turning motor 25 which output shaft projects toward the front, said arm cylinder frame 32 having the arm extension and contraction cylinder 26 integrally attached thereto.

This arm extension and contraction cylinder 26 is a double-rod type hydraulic cylinder device capable of supporting the twisting moment imposed on a piston 26b. That is, the cylindrical piston 26b is slidably fitted in a cylinder hole 26a of circular cross-section formed in the cylinder frame 32. At least one of the two piton rods 26c and 26d connected to the front and rear of said piston 26b, for example, the front rod 26c at the front end, is rectangular in cross section. And a guide hole 26f in a front cylinder head 26e through which the front rod 26c extends is also rectangular in cross section to provide a rotation preventer, with a sealing material fitted therein. Therefore, even if a twisting moment is imposed on the front rod 26c, it is supported by the front cylinder head 26e through the guide hole 26f, so that the heretofore required accessory rotation preventing mechanisms, such as guide rods, are no longer necessary, making it possible to make the first through fourth combined-use arms 22A through 22D compact. In addition, the rear rod 26d may have a rotation preventing cross section, or the cylinder hole 26a and piston 26b may have a rotation preventing cross section, such as an elliptic or rectangular cross section.

(Working Devices 24)

Each working device 24 arranged to be extended and retracted toward and away from the outer periphery by the front rod 26c, is provided with the positioning mechanism, the cleaning tool inserting mechanism, the probe inserting mechanism, and the pressure-feed mechanism. Further, it is also provided with a pressing cylinder device 34, which is a pressing and driving device, capable of extending and retracting the working device 24 toward and from the front, and an extendable frame 35 supporting the working device 24 and adapted to be extended or retracted by said pressing cylinder device 34. And a push-in cylinder device 38, which is a push-in driving device, is installed in the extendable frame 35, so that the cleaning brush 12, flaw detection probe 13 and inner nozzle 23 can be pushed into the narrow tube 3 by the push-in cylinder device 38.

The details of the working device 24 will be described. The cylinder tube 34a of the pressing cylinder device 34 is fixed perpendicularly to the front rod 26c of the arm extending and retracting cylinder device 26 through a rectangular hole, and the extendable frame 35 is attached to the piston rod 34b of the pressing cylinder device 34. This extendable frame 35 comprises a front end member 35a having a push-in nozzle 41 formed with a push-in port 41a, a base end member 35b having the piston rod 34b connected thereto, two guide rods 36 for connecting the front end member 35a and the base end member 35b, a single guide support shaft 37 and an arcuate cover 33. The front end member 35a is provided with a slide guide 35c slidably fitted on the cylinder tube 34a of the pressing cylinder device 34. Further, the push-in cylinder device 38 installed on the base end member 35b has its cylinder tube 38a fixed on the base end member 35b to stand thereon, so that the piston rod 38b is driven for extension and retraction with respect to the push-in port 41. Mounted on said guide rods 36 is a push-in member 39 movable along the axis Oa of the push-in port 41a. The push-in member 39 is formed with an engaging recess 39a engageable with the inner nozzle 23, and has connected thereto the piston rod 38b of the push-in cylinder device 38.

Mounted on the guide support shaft 37 is an insertion guide body 40 turnable between a push-in position on the axis Oa and a standby position spaced a predetermined angle (e.g., 90°) from the axis Oa around the guide support 37. In this connection, when it is desired to insert the cleaning brush 12, flaw detection probe 13 and inner nozzle 23 successively into the narrow tube 3, this would be attained by arranging them in a line and pushing them in at once; in this case, however, it would be necessary to prolong the stroke of the push-in cylinder device 38, resulting in an increase in the overall length of the working device 24. Therefore, in this working device 24 it is arranged that after the cleaning brush 12 alone has been pushed into the narrow tube 4, the flaw detection probe 13 and inner nozzle 23 are pushed in; this two-stage push-in makes it possible to reduce the stroke of the push-in cylinder device 38 and to make the latter compact.

That is, the insertion guide body 40 comprises a pair of C-shaped upper and lower frames 40a and 40b spaced a predetermined distance in the direction of extension and retraction and supported for turning movement on the guide support shaft 37, and four rods 40c for connecting the frames 40a and 40b. And this insertion guide body 40 is arranged to support the flaw detection probe 13 and the inner nozzle 23 for movement toward the push-in port 41a. Further, this insertion guide body 40 is urged to turn from the standby position shown in phantom line in FIG. 10 to the push-in position shown in solid line by a torsion coil spring 42 installed on the front end of the guide support shaft 37.

Therefore, when the first through fourth combined-use arms 22A through 22D are contracted for retraction to the storage positions (the brush distribution positions b through e in FIG. 15) and, as shown in FIG. 14(a), the cleaning brush 12 held in the brush distributing device 28 is fitted in the extendable frame 35, the insertion guide body 40 in the push-in position is turned to the standby position against the torsion coil spring 42. And as shown in FIG. 14(b), the conical front end of the cleaning brush 12 is pushed into the push-in port 41a through the push-in member 39 by the push-in cylinder 38, so as to prevent the returning of the insertion guide body 40, so that and the cleaning brush 12 is held in the extension and retraction position. Further, when the first through fourth combined-use arms 22A through 22D are moved to their respective working positions, as shown in FIGS. 14(C) and (D), the cleaning brush 12 is pushed into the narrow tube 3 by the push-in cylinder 38 through the push-in member 39. At this time, when the front end of the cleaning brush 12 has entered the narrow tube 3, the arm turning motors 25 and arm extension and contraction cylinder devices 26 of the combined-use arms 22A through 22D are temporarily held in a free state capable of following a driven load (hereinafter referred to as the free state) so that positional deviation is accommodated. Thereafter, when the push-in member 39 is returned to the base end side, the insertion guide body 40 is turned to the extension and retraction position by the torsion coil spring 39 and the inner nozzle 23 is engaged with the engaging recess 39a of the push-in member 39. Further, as shown in FIGS. 14(e) and (f), the flaw detection probe 13 and inner nozzle 23 are pushed into the narrow tube 3 by the push-in cylinder 38 through the push-in member 39.

(Inner Nozzle 23)

The inner nozzle 23 is, of course, firmly fixed in the narrow tube 3, but it is also important that cancellation of the fixed state be quickly and reliably effected. Our experiments have revealed that the conventional fixing mechanism of the type axially compressing a single rubber sleeve by a compression member and then allowing it to extend, is capable of fixing by the frictional force produced by expansion between the rubber sleeve and the inner surface of a tube but that this fixing mechanism fails to produce a uniform axial extending force or a large retaining force, so that the cancellation cannot be smoothly effected. Further, the conventional arrangement has been designed with importance placed only on the frictional force produced between the rubber sleeve and the inner surface of a tube. The present inventor has found that actually the peripheral edge of the rubber sleeve cuts into the space between the compressed member and the inner surface of the tube, a wedge phenomena, producing a large frictional force.

As a result, in the tube fixing mechanism for the inner nozzle 23, the rubber sleeve is replaced by a binding ring assembly 43 composed of a plurality of elastic rings 43a which are small in width as compared with the outer diameter and which are made of a rigid synthetic rubber whose hardness is (JIS) 60 or more, and spacer rings 43b interposed between these elastic rings 43a and placed on the opposite sides. And in that the binding ring assembly 43 is axially compressed, a first wedge action produced by the taper end surfaces of the spacer rings 43b causes the elastic rings 43a to expand toward the outer periphery, thus producing a frictional resistance. Further, a second wedge action is produced by the extended rigid elastic rings 43a cutting into the spaces between the spacer rings 43b and the inner surface of the narrow tube 3, and by means of this second wedge action, the inner nozzle 23 can be fixed to the narrow tube extremely firmly and yet can be released quickly and reliably.

Figure 12:
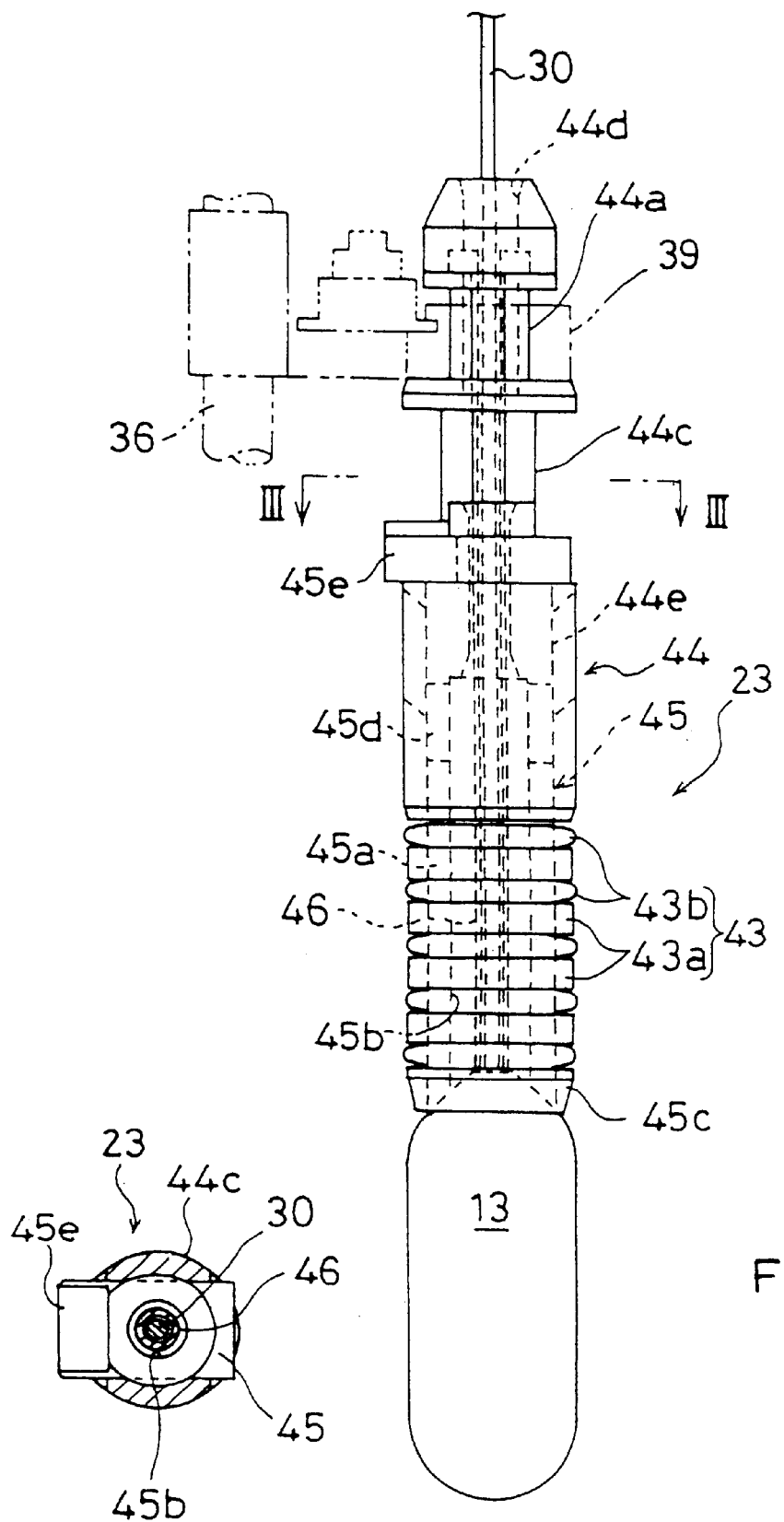
FIG. 12(a) is a side view of an inner nozzle.
FIG. 12(b) is a sectional view taken along the line III in FIG. 12(a)
Figure 13:
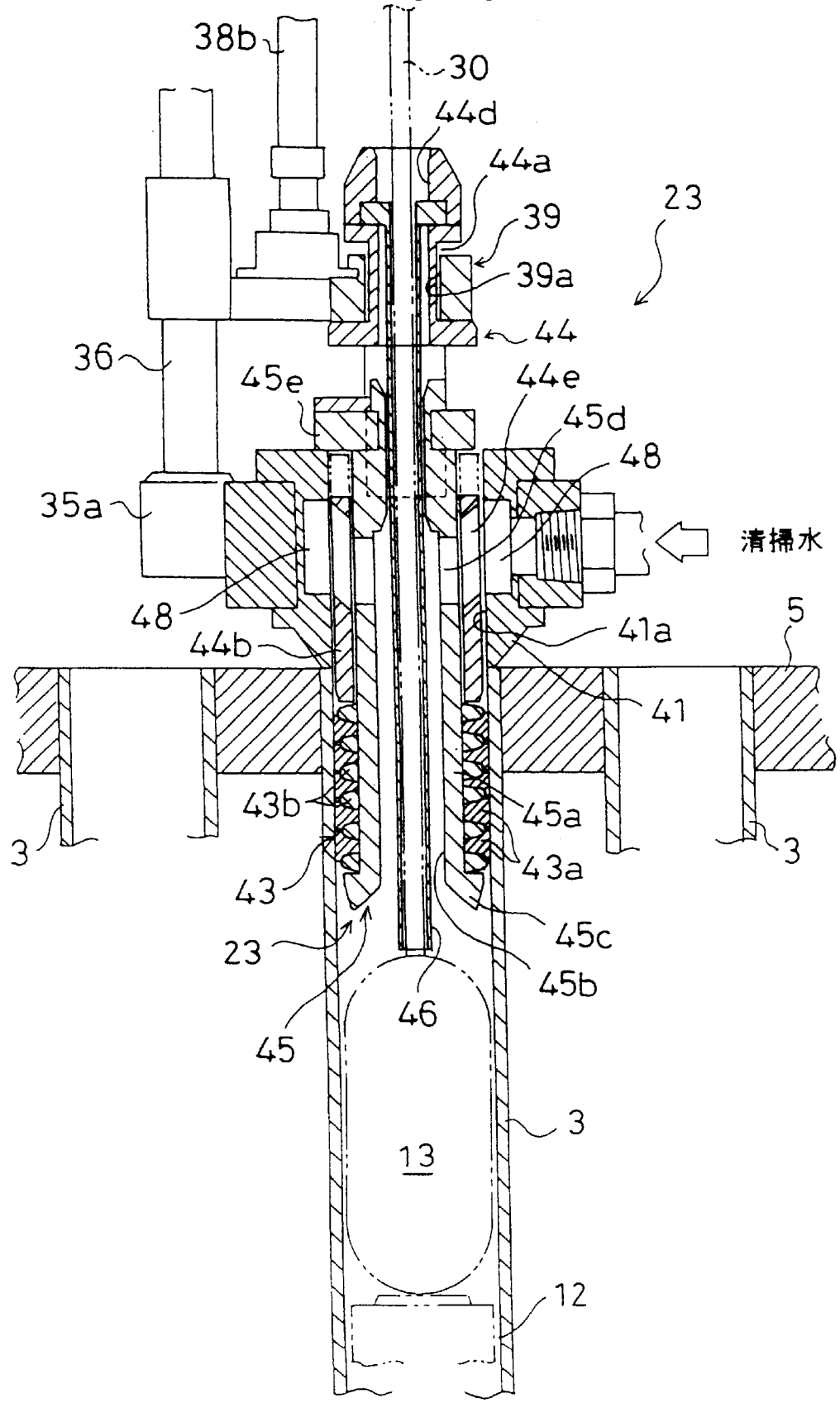
FIG. 13 is a side view, in section, showing how the inner nozzle is fixed in a narrow tube.
Figure 14:
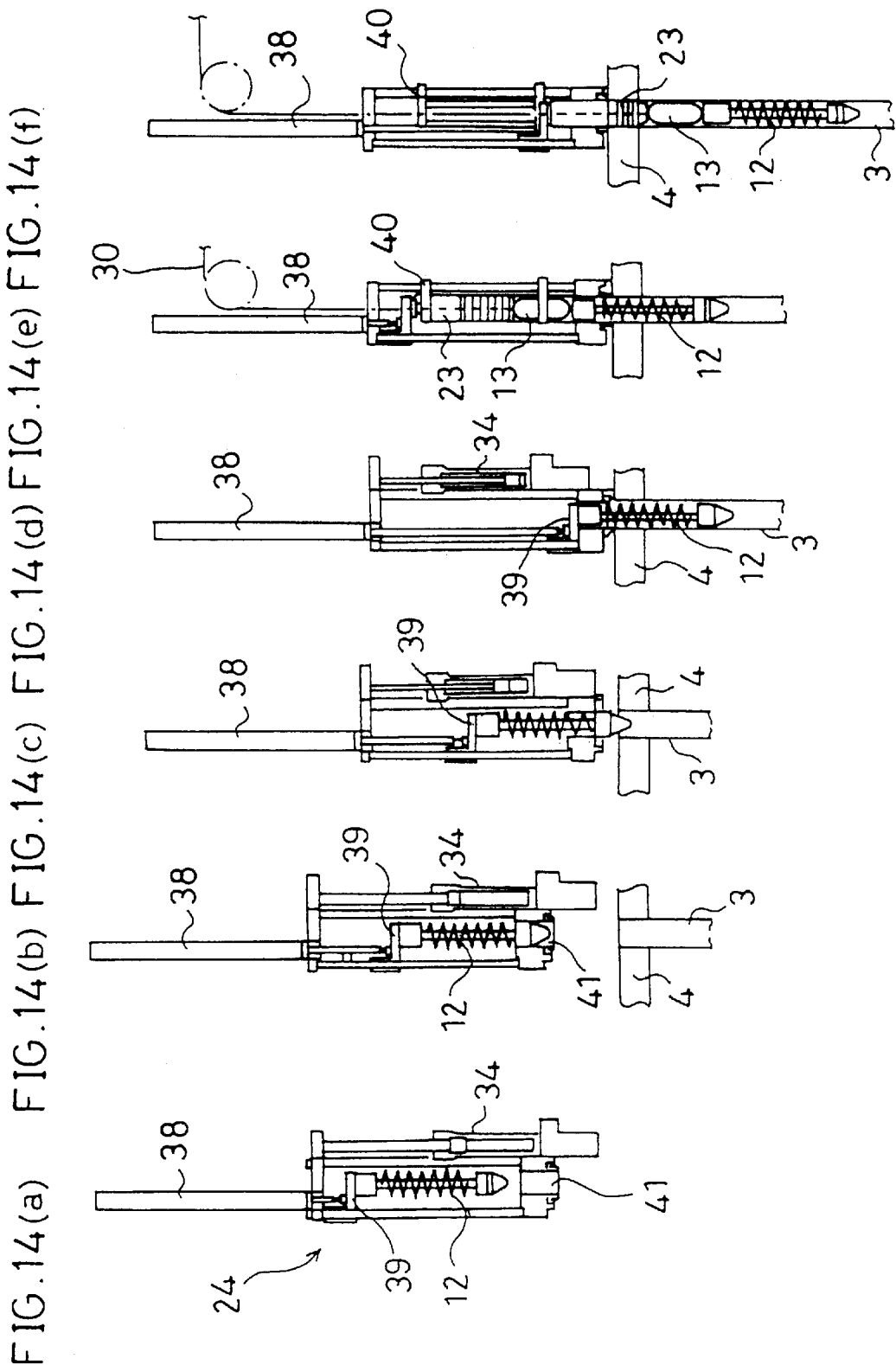
FIG. 14(a) is a sectional view showing one step an operating procedure.
FIG. 14(b) is a sectional view showing another step in the operating procedure.
FIG. 14(c) is a sectional view showing another step in the operating procedure.
FIG. 14(d) is a sectional view showing another step in the operating procedure.
FIG. 14(e) is a sectional view showing another step in the operating procedure.
FIG. 14(f) is a sectional view showing another step in the operating procedure.

The arrangement of the inner nozzle 23 will be described in more detail with reference to FIGS. 12 and 13. The inner nozzle 23 comprises a push-in sleeve 44 engaged with the push-in member 39 on the base end side, an inner sleeve member 45 fitted for slide movement in the direction of retraction on the front end of the push-in sleeve 44, the binding ring assembly 43 fitted on the inner sleeve member 45, and a push-in pipe 46 attached to the push-in sleeve 44 and having the inspection cable 30 movably inserted therein. And the push-in sleeve 44 is formed on the base end side with a driven sleeve portion 44a engaged with the engaging recess 39a of the push-in member 39, and the compression sleeve portion 44b slidably fitted on the barrel portion 45a of the inner sleeve member 45 and the driven sleeve portion 44a are connected together through a pair of connecting members 44c. And the driven sleeve portion 44a is formed with an axial hole 44d extending therethrough, while the compression sleeve portion 44b is formed with a water feed port 44e. The inner sleeve member 45 has an insertion hole 45b axially extending through the barrel portion 45a having the binding ring assembly 43 fitted thereon, and a stop 45c projecting therefrom and disposed at the front end for preventing the binding ring assembly 43 from slipping off. The base end of the barrel portion 45a has a water injection port 45d bored therein which communicates with the water feed port 44e during compression of the binding ring assembly 43, the base end of said barrel portion 45a having a locking dog 45e projecting therefrom, which is a locking member adapted to be locked in the inlet of the push-in port 41a.

The push-in pipe 46 has an inner diameter such that the inspection cable 30 of the flaw detection probe 13 can be movably inserted therein, and its base end is fixed in the axial hole 44d of the driven sleeve portion 44a concentrically with the axis Oa. And this push-in pipe 46 extends through the insertion hole 45b until its front end reaches the front end position of the inner nozzle 23, and the flaw detection probe 13 is pushed out by this push-in pipe 46. In FIG. 6, the numeral 47 denotes a guide sheave for guiding the inspection cable 30 connected to the flaw detection probe 13; and 81 denotes a distance sensor installed on each of the first and second combined-use arms 22A and 22B to measure the distance to the tube sheet 4 and detect the position of the robot body 21.

Therefore, when the push-in cylinder device 38 is extended and the inner nozzle 23 is moved toward the front end by the push-in member 39, the flaw detection probe 13 is forwarded along the insertion guide body 40. And it is pushed into the narrow tube 3 through the push-in port 41a to push the cleaning brush 12 further inward. And the inner nozzle 23 is inserted into the push-in port 41a and the locking dog 45e is locked at the inlet of the push-in port 41a, whereupon the insertion of the inner sleeve member 45 is stopped; however, since the push-in sleeve 44 is further pushed in, the binding ring assembly 43 is compressed by the compression sleeve portion 44b. Thereby, the first wedge action of the binding ring assembly 43 produces a frictional force and the second wedge action firmly fixes the inner nozzle 23 in the narrow tube 3.

In addition, even if there is produced during push-in movement a resistance to the pushing-in of the cleaning brush 12 and flaw detection probe 13, the flaw detection probe 13 is pushed in by the push-in sleeve 44 through the push-in pipe 46; therefore, there is no possibility of the biding ring assembly 43 being compressed as the push-in of the inner sleeve member 45 is obstructed.

Further, in the probe inserting mechanism, with the binding ring assembly 43 compressed, the water feed port 44e of the compression sleeve portion 44b and the water injection port 45*d* of the barrel portion 45*a* are aligned with the cleaning water feed hole 48 formed in the push-in nozzle 41, and cleaning water is fed to this cleaning water feed port 48, so that cleaning water is fed from the inner nozzle 23 into the narrow tube 3 through the water feed port 44*e* and water injection port 45*d*, and the cleaning brush 12 and flaw detection probe 13 are pushed in along the narrow tube 3, the narrow tube 3 is cleaned by the cleaning brush 12.

(Brush Distributing Device 28)

The brush distributing device 28, which is a cleaning tool distributing device, for feeding cleaning brushes 12 to the working devices 24 of the first through fourth combined-use arms 22A through 22D will be described with reference to FIGS. 15 through 18.

The brush distributing device 28 is disposed in the brush supplying position a on the outer periphery of the arm holder 27. And it comprises a brush supplying tool 51 to which cleaning brushes 12 are successively fed from the brush supplying device 14 through a brush feed hose 54, reaction supports 52 disposed at the brush distribution positions (the same as the storage positions) b through e of the first through fourth combined-use arms 22A through 22D, and a supplying arm device 53 which is revolvable around the axis O of the front frame 31 and which is extendable. This supplying arm device 53 is arranged to receive a cleaning brush 12 held in the brush supplying tool 51, such received cleaning brushes 12 being distributed from the brush supplying position a to the brush distribution positions b through e.

Figure 18:
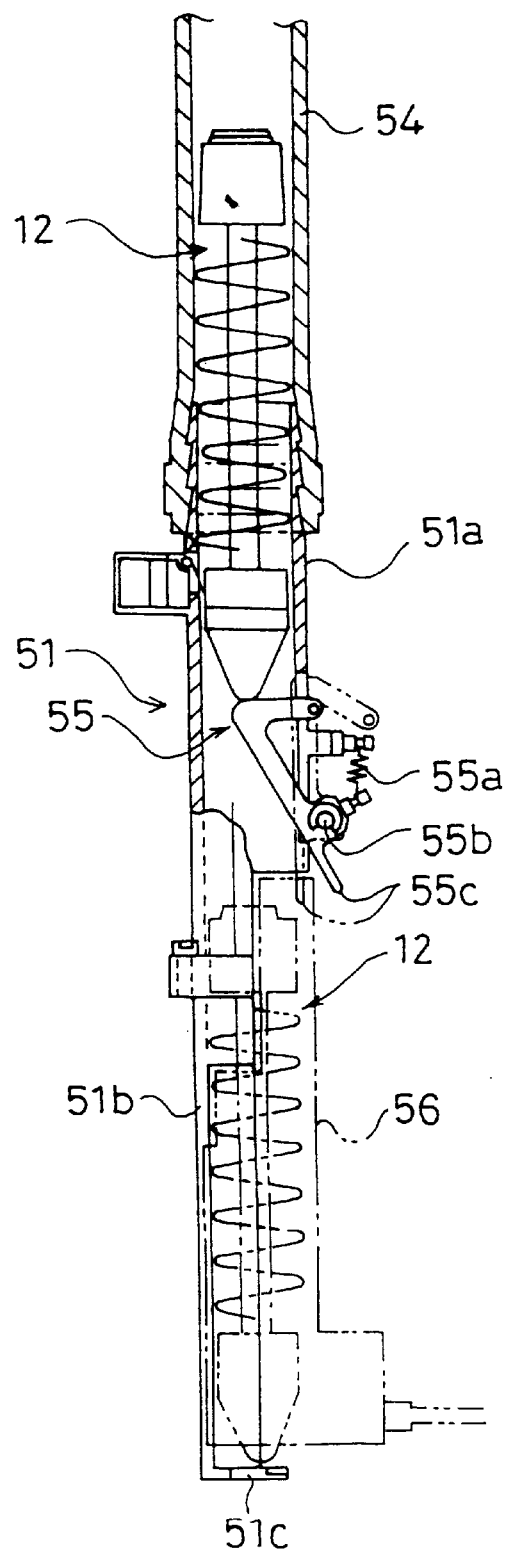
FIG. 18 is a longitudinal section showing the brush supplying tool of the brush distributing device.

The brush supplying tool 51, as shown in FIG. 18, has a brush cover 51*b* attached to the front end of a cylindrical body portion 51*a* to which the brush feed hose 54 is connected, which brush cover 51*b* constitutes part of a cylindrical form and has a receiver plate 51*c*. And the body portion 51*a* has a brush locking lever 55 for temporarily stopping a cleaning brush 12 fed from the brush feed hose 54, said brush locking lever being turnably disposed through a tangential pin 55*b* and urged for turning movement toward the projecting side by a spring 55*a*. Further, the brush locking lever 55 has a driven portion 55*c* projecting therefrom on the base end side, it being arranged that when the brush holder 56 of the supplying arm device 53, to be later described, is fitted to the brush cover 51*b*, the driven part 55*c* is pushed against the spring 55*a*, retracting the brush locking lever 55 to allow a cleaning brush 12 to be fed from the body portion 51*a* to the brush holder 56, which is a cleaning tool holder.

The supplying arm device 53 has a brush distributing motor 57 disposed at the position of the axis O of the front frame 31, and the output shaft 57*a* of the brush distributing motor 57 has mounted thereon the cylinder tube 58*a* of a brush extending and retracting cylinder device 58 constituting a revolving arm. Further, said brush holder 56 is attached to the piston rod 58*b* of the brush extending and retracting cylinder device 58. This brush holder 56 is a substantially semicylindrical body adapted to be fitted to the brush cover 51*b* and having a brush support block 56*a* attached to the front end thereof for preventing a cleaning brush 12 from slipping off. In addition, the reaction supports 52 at the brush distribution positions b through e are used to retain the turning force which is imposed when a cleaning brush 12 held in the brush holder 56 is delivered to one of the extendable frames 35 of the first through fourth combined-use arms 22A through 22D.

Therefore, a cleaning brush 12 fed from the brush supplying device 14 to the brush supplying position a through the brush feed hose 54 is once stopped at the body portion 51*a* by the brush locking lever 55 of the brush supplying tool 51. And the brush holder 56 of the supplying arm device 53 is fitted to the brush cover 51*b*, whereby the brush locking lever 55 is retracted and the cleaning brush 12 is delivered to the brush holder 56. Then, in order to avoid contact with the arm turning motor 25, the brush extending and retracting cylinder 58 is contracted and the brush holder 56 is revolved along the inner peripheral path A by the brush distributing motor 57 and is stopped at a position corresponding to the intended one of the first through fourth combined-use arms 22A through 22D. Thereafter, the brush holder 56 is projected to the brush distribution reference positions b' through e' by the brush extending and retracting cylinder 58 and then turned so that cleaning brushes 12 are stopped at the brush distribution positions b through e. Thereby, successively fed-in cleaning brushes 12 are distributively fed to the first through fourth combined-use arms 22A through 22D.

(Code Reel Device 29)

Figure 19:
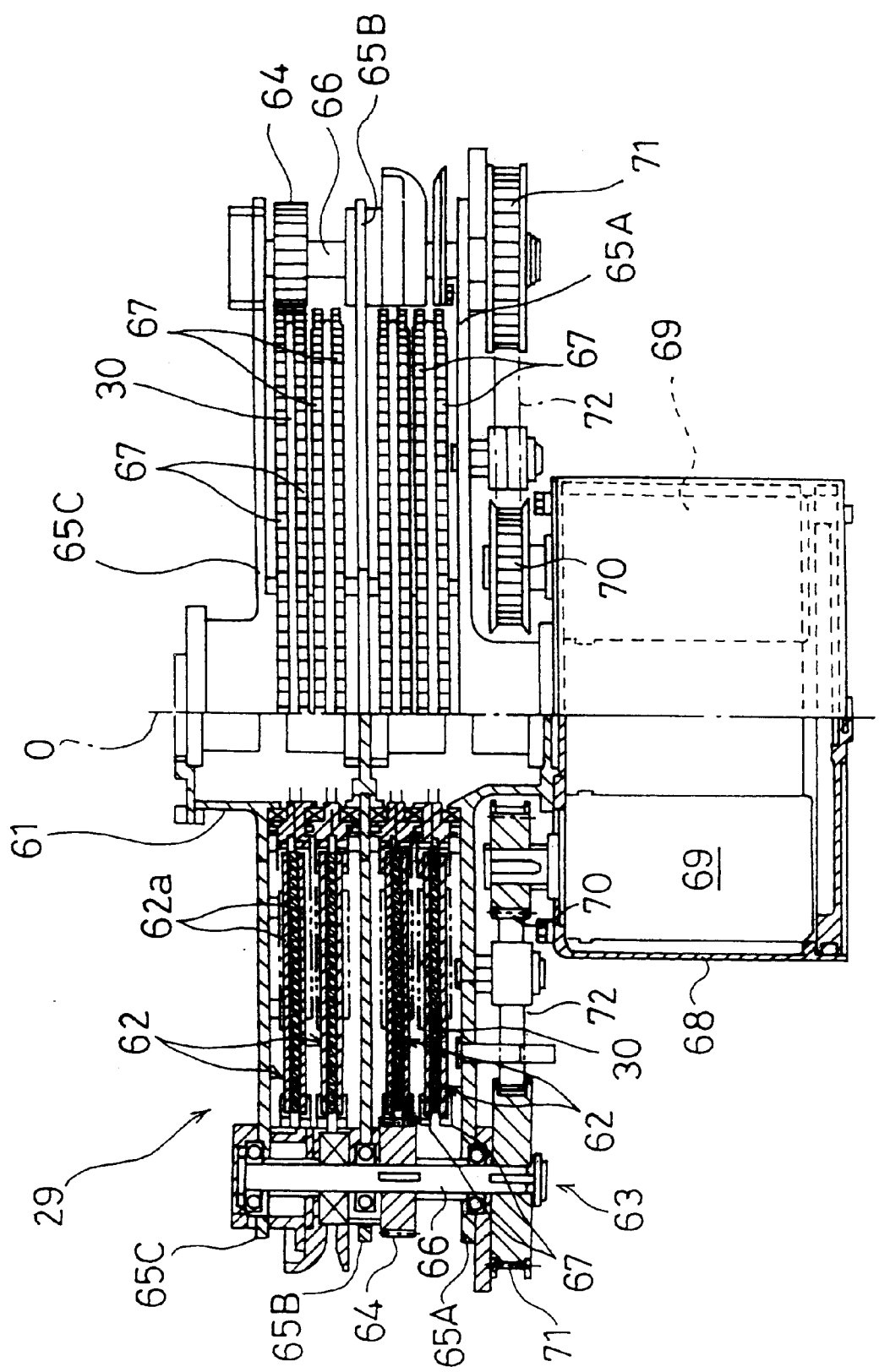
FIG. 19 is a side view, in half section, showing a code reel device.
Figure 20:
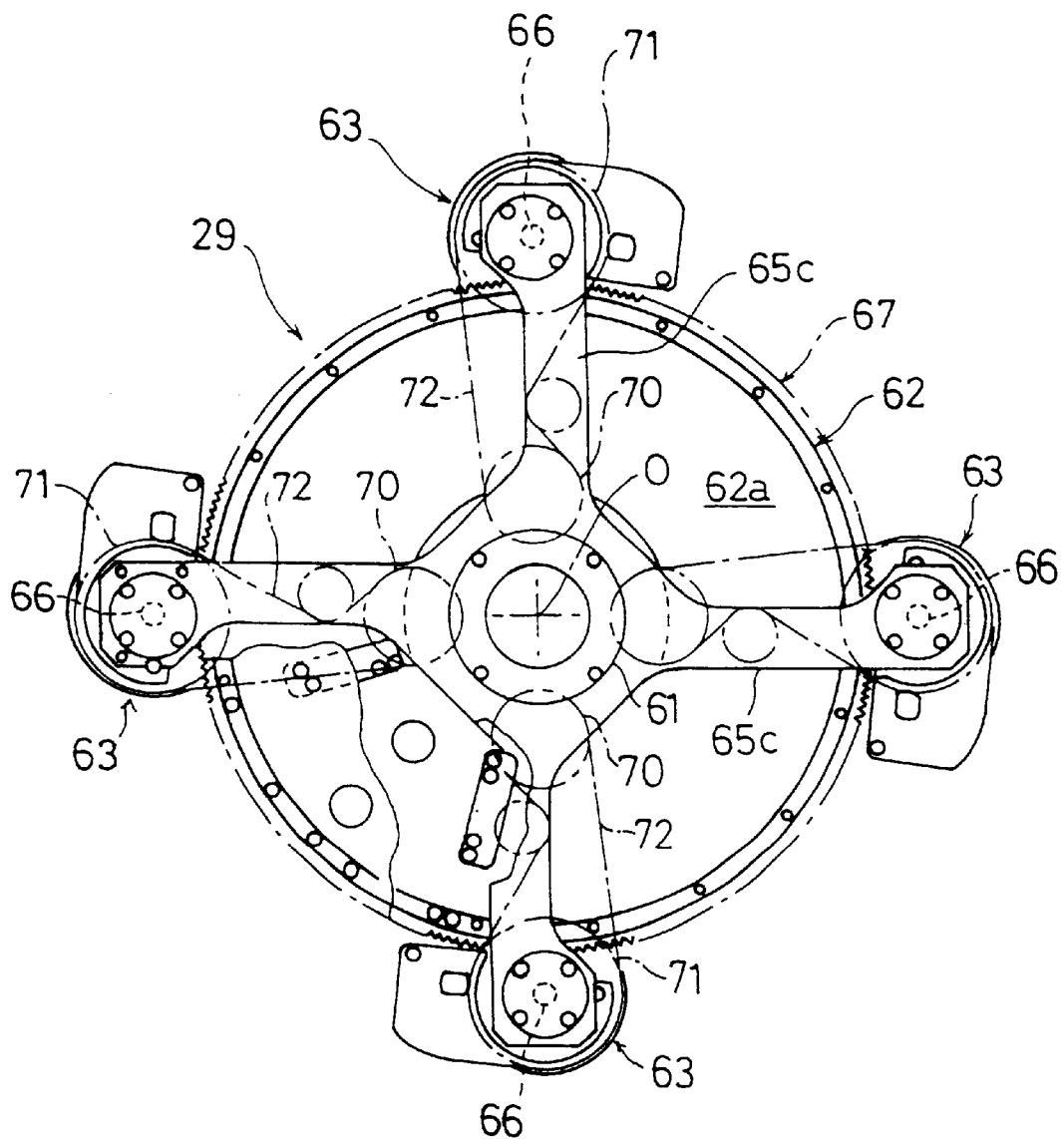
FIG. 20 is a rear view showing the code reel device.

Next, the code reel device 29 which constitutes the probe returning mechanism will be described with reference to FIGS. 19 and 20. This code reel device 29 is used to spirally wind the inspection cables 30 of the flaw detection probes 13 used in the first through fourth combined-use arms 22A through 22D, wherein four take-up reels 26 are respectively rotatably supported on a support sleeve 61 disposed at the robot axis O. These take-up reels 62 are formed of a pair of storage guide plates 62*a* disposed with a storage space defined therebetween which corresponds to the width of the inspection cables 30, so that the inspection cables 30 can be spirally wound in their respective storage spaces.

The reel winding device 63 for driving for rotation the take-up reels 62 is arranged to drive for rotation the individual take-up reels 62 by driving gears 64 disposed on the outer peripheries of the take-up reels 62 and spaced 90° from each other. That is, reel support plates 65A through 65C disposed on the front, intermediate and back regions of the take-up reels 62 of the support sleeve 61 are provided with four rotatable shafts 66 parallel with the axis O and spaced 90° from each other. And the driving gears 64 attached to the rotatable shafts 66 mesh with ring gears 67 formed on the outer peripheries of the storage guide plates 62*a*. Further, four reel rotating motors 69 are installed at intervals of 90° within a motor box 68 disposed on the front associated with the support sleeve 61, and a timing belt 72 is entrained for operative association between each driving timing gear 70 on the output shaft and each driven timing gear 71 on the rotatable shaft 66. Therefore, the reel rotating motors 69 drive for rotation the take-up reels 62 to pay out or rewind the inspection cables 30, and it is possible to apply a predetermined load of tension to the inspection cables 30 to prevent them from slacking.

(Operating Method)

The method of operating the working robot of above construction for heat exchangers will be described.

1. (Carrying-in and Preparation of Robot)

The robot 11 with the first through fourth combined-use arms 22A through 22D held in their stored position is carried into the water chamber 2A through the manhole 5. And the robot body 21 is disposed at the work starting position on the tube sheet 4 and the working devices 24 of the first through fourth combined-use arms 22A through 22D unfolded into the working position are driven and the inner nozzles 23 are inserted in narrow tube 3 and fixed therein, and the robot 11 is set. The brush feed device 14, hydraulic unit 15, water feed pump unit 16, fall-preventing device 17 and control device 18 which are the rest of the support equipment are respectively set, and the disposition of the narrow tubes 3 and the travel path for the robot body 11 are inputted into the control device 18.

2. (Brush Feeding)

Cleaning brushes 12 are successively fed to the brush supplying tool 51 in the brush supplying position a from the brush feed device 14 through the brush feed hose 54, and such cleaning brush 12 is locked by the brush locking lever 55. Subsequently, when the supplying arm device 53 reaches the brush supplying position a, the brush holder 56 is fitted to the brush cover 51b to retract the brush locking lever 55, so that the cleaning brush 12 is delivered to the brush holder 56. And the supplying arm device 53 causes the brush holder 56 to perform revolving movement and extending and retracting movement, moving from the corresponding one of the brush distribution preparation positions b' through e' of the intended one of the first through fourth combined-use arms 22A through 22D to the corresponding one of the brush distributing positions b through e, where it is stopped. Then the intended one of the first through fourth combined-use arms 22A through 22D is contracted and turned to the corresponding one of the brush distributing positions b through e (storage positions). When the cleaning brush 12 held in the brush holder 56 is fitted to the extendable frame 35, the insertion guide body 40 at the push-in position is turned to the standby position, and the front end of the cleaning brush 12 is pushed into the push-in port 41a and held therein by the push-in cylinder 38.

3. (Insertion and Fixing)

When the first through fourth combined-use arms 22A through 22D are extended and turned to their respective working positions, a cleaning brush 12, which is the first member to be inserted, is pushed into a, narrow tube 3 by the push-in cylinder 38 through the push-in member 39. When the front end of the cleaning brush 12 enters the narrow tube 3, the arm turning motor 25 and the arm extending and contracting cylinder device 26 are rendered temporarily free, thus accommodating the positional deviation and hence smooth push-in. And when the push-in member 39 is returned to the base end side, the insertion guide body 40 is returned to the original position and the flaw detection probe 13 and inner nozzle 23 are returned to the push-in position. Then, the push-in cylinder 38 moves the push-in member 39 toward the front end so that the flaw detection probe 13 and inner nozzle 23 are pushed into the narrow tube 3 through the push-in port 41a. At this time, when the inner nozzle 23 is inserted into the push-in port 41a, the inner sleeve member 45 is locked through the locking dog 45e and the push-in sleeve 44 is further pushed in, whereby the binding ring assembly 43 is compressed and is pushed outward toward the outer periphery by the expansion of the elastic rings 43a, so that the inner nozzle 23 is firmly fixed in the narrow tube 3.

4. (Positioning of Robot)

Herein, if one combined-use arm, e.g., the second combined-use arm 22B is released from the narrow tube 3, the robot will be held in a fixed position with the inner nozzles 23 of the other three, i.e., the first, third and fourth, combined-use arms 22A, 22C and 22D fixed in the narrow tubes 3. If, however, all of the arm turning motors 25 and arm extending and contracting cylinder devices 26 for the three, i.e., the first, third and fourth, combined-use arms 22A, 22C and 22D were drive-controlled, the narrow tubes 3 could be overloaded through the inner nozzles 23 owing to manufacturing errors or strains, forming a cause of damaging the narrow tubes 3 or robot 11. Thus, if three of the six drive systems consisting of the arm turning motors 25 and arm extending and contracting cylinder devices 26 for the first, third and fourth combined-use arms 22A, 22C and 22D were drive-controlled, the positioning of the robot body 21 would be possible. With the drive control of the three drive system, however, it has been found that due to insufficient mechanical accuracy or the like, the positioning accuracy tends to lower. Herein, therefore, four drive systems are drive-controlled, leaving the other drive systems free to follow the drive-controlled drive systems, improving the positioning accuracy.

Figure 21:
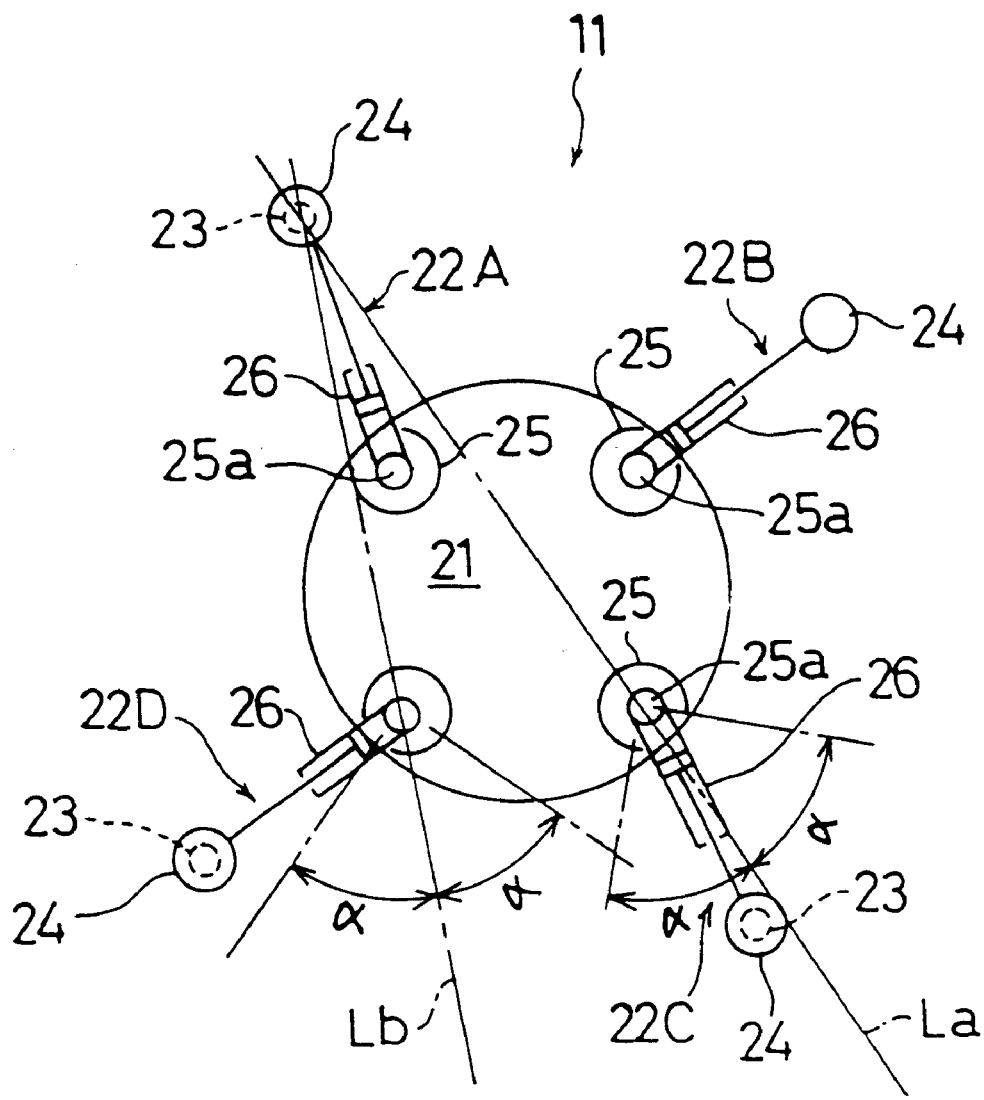
FIG. 21 is a view for explaining the operation.

That is, as shown in FIG. 21, in the vertical tube sheet 4, first, the arm turning motor 25 and arm extending and contracting cylinder device 26 of the first combined-use arm 22A positioned uppermost are control-driven. Further, for the third and fourth combined-use arms 22C and 22D, draw median lines La and Lb from the axis Oa of the inner nozzle 23 of the first combined-use arm 22A through the output shafts 25a of the arm turning motors 25. And in the case of drive-controlling the third combined-use arm 22C which is in the range of angle $\alpha$ with the center at the output shaft 25a on either side of each of the median lines La and Lb, the arm turning motor 25 is drive-controlled while the arm extending and contracting cylinder device 26 is rendered free. Further, in the case of drive-controlling the fourth combined-use arm 22D which is outside the range of angle $\alpha$, the arm turning motor 25 is rendered free while the arm extending and contracting cylinder device 26 is controlled. With this range of angle $\alpha$, an actuator on the side where the turning moment around the inner tube 23 of the first combined-use arm 22A is effectively supported is selected. In this case, $\alpha$ is set at about 45°, for example.

5. (Pressing of Robot Body 21)

In order for the robot body 21 to hold a fixed distance (working reference position) from the tube sheet 4, distance sensors 81 are arranged on the first and second combined-use arms 22A and 22B which are disposed in upper positions to control the position of the robot body 21.

For example, when the first combined-use arm 22A is extracted from the narrow tube 3, the robot body 21 is held by the second through fourth combined-use arms 22B through 22D which are not in a balanced position but in an unstable position, while the portion of the robot body 21 associated with the first combined-use arm 22A tends to be somewhat spaced from the tube sheet 4 owing to the reaction produced upon extraction or a play or distorsion in the robot mechanism. Thus, when the first combined-use arm 22A is moved to the next narrow tube 3, the push-in nozzle 41 finds itself separate from the opening in the narrow tube 3, so that a cleaning brush 12, which is the first member to be inserted, could not be correctly inserted.

To solve this problem, in this embodiment, the robot body 21 is moved a predetermined distance from the working reference position toward the tube sheet 4. That is, during the movement of the first combined-use arm 22A to receive a cleaning brush 12, the inner nozzles 23 of the second through fourth combined-use arms 22B through 22D remain fixed in the narrow tubes 3. At this time, the pressing cylinder devices 34 of the second through fourth combined-use arms 22B through 22D develop the function of pressing the inner nozzles 23 toward the innermost regions of the narrow tubes 3, while the robot body 21 is positioned at the working reference position spaced a fixed distance apart from the tube sheet 4. When the first combined-use 22A is stopped opposed to the intended narrow tube 3, such pressing function is canceled to allow the robot body 21 to move to a position which is close to the tube sheet 4 by a predetermined distance. Thereby, the push-in nozzle 41 of the first combined-use arm 22A is reliably brought close to the narrow tube 3, so that the cleaning brush 12, flaw detecting probe 13 and inner nozzle 23 are smoothly inserted. After the insertion of the inner nozzle 23, the pressing cylinder device 34 is caused to develop the pressing function to retract the robot body 21 from the close position to return it to the working reference position. Thereby, the problem caused by the change of the attitude of the robot body 21 during the extraction of the inner nozzle 23 is solved.

Instead of the above method, the working reference position for the robot body 21 may be located closest to the tube sheet 4 while setting the limit of projection to which the push-in nozzle 41 is projected by each pressing cylinder device 34 such that it can be pushed in by a predetermined distance more beyond the working reference position toward the cleaning brush 3. If, for example, the first combined-use arm 22A is released from the narrow tube 3, at the next narrow tube 3 it is pushed in over the working reference position by an amount corresponding to the push-in distance of the first combined-use arm 22A, whereby the push-in nozzle 41 can be reliably brought close to the narrow tube 3. And after the inner nozzle 23 has been inserted, the push-in distance of the first combined-use arm 22A is brought back to the original value; thus, it is returned to the working reference position.

6. (Cleaning and Flaw Detection)

With the binding ring assembly 43 compressed, the cleaning water fed to the cleaning water feed hole 48 from the water feed pump unit 16 through the water feed tube and water feed pipe is fed into the inner nozzle 23 through the water feed port 44e and water injection port 45d. Thereby, the cleaning brush 12 and the flaw detection probe 13 are pushed into the narrow tube 3 and moved, so that the inner surface of the narrow tube 3 is cleaned by the cleaning brush 12. At this time, the detection cable 30 of the flaw detection probe 13 is paid out from the take-up reel 62 which is in the free state. Further, the length of the detection cable 30 is detected in terms of the angle of rotation of the take-up reel 62 (or the reel rotating motor 69). Thereby, just when the paid-out length of the detection cable 30 has reached the length of the narrow tube 3 and the flaw detection probe 13 is about to leave the outlet of the narrow tube 3, the take-up reel 62 is braked so that the paying-out is stopped and so is the flaw detection probe 13. And the reel rotating motor 69 is driven to wind the detection cable 30 on the take-up reel 62 and the flaw detection probe 13 is pulled back along the narrow tube 3. During this return travel, a flaw detection test on the narrow tube 3 is conducted, and the data on the position of the flaw detection probe 13 in terms of the angle of rotation of the take-up reel 62 (or the reel rotating motor 69), and detection signals from the flaw detection probe 13 are fed into the control device 18, where the narrow tube 3 just cleaned is inspected in real time. And it is returned from the narrow tube 3 to the insertion guide body 40 of the extendable frame 35 through the push-in nozzle 41, thus completing the cleaning and inspection, whereupon it is moved to the next narrow tube 3.

In addition, although the flaw detection test has been conducted during the return travel, it may be conducted during the forward travel attended by a cleaning brush 12. In this case, the rate of return travel of the flaw detection probe 13 can be increased, so that the cycle time required for the inspection can be shortened.

7. (Movement of Combined-Use Arms)

Immediately after the inner nozzle 24 has been mounted in position, the operation (brush feeding) of the rest of the combined-use arms 22A through 22D is stared, such operation being repeated for each of the first through fourth combined-use arms 22A through 22D.

8. (Movement of Robot)

When the robot body 21 is to be moved, this is done such that with all the first through fourth combined-use arms 22A through 22D fixed in narrow tubes 3 through the inner nozzles 23, four drive systems consisting of arm turning motors 25 and arm extending and contracting cylinder devices 26 are driven to move the robot body 21.

(Effects)

According to the above embodiment, the robot body 21 is provided on the outer periphery with four, i.e., the first through fourth, combined-use arms 22A through 22D adapted to be extended and contracted along the tube sheet 4, and the front ends of the first through fourth combined-use arms 22A through 22D are each provided with a working device 24 having a cleaning mechanism and movement mechanism. Therefore, the robot 11 can be moved in any direction along the tube sheet 4. Further, as compared with the conventional robot having its cleaning mechanism and movement mechanism separated from each other, the number of members, such as arms, can be reduced, and the robot 11 can be made compact by retracting the first through fourth combined-use arms 22A through 22D. Thereby, carrying the robot into and out of the water chamber 2A through the manhole 5 is facilitated and preparatory operations, such as assembling and disassembling, can be reduced to shorten the operating time.

Further, the first through fourth combined-use arms 22A through 22D and their working devices 24 are selected and successively driven, and the moving and positioning of the robot body 21 are effected by three of the first through fourth combined-use arms 22A through 22D. During this positioning, the cleaning of narrow tubes 3 is effected by the individual working devices 24, while the rest of the first through fourth combined-use arms 22A through 22D is extended and contracted to move the working device 24 to the next narrow tube 3. Therefore, by combining the movement and cleaning operation of the robot 21 effected by the first through fourth combined-use arms 22A through 22D and the movement of the working device 24, the cleaning of a number of narrow tubes 3 can be efficiently performed and the cleaning time can be greatly reduced.

Further, since the first through fourth combined-use arms 22A through 22D are adapted to be turned and extended and contracted by the arm turning motors 25 and arm extending and contracting cylinder devices 26, the construction is extremely simplified and the operation of the first through fourth combined-use arms 22A through 22D can be easily controlled.

Further, the robot body 21 and cover 19 are formed with storage spaces 19a, so that the entire robot 11 assumes a cylindrical form with the center at the robot axis O in the storage position in which the first through fourth combined-use arms 22A through 22D are contracted for retraction. Therefore, the robot 11 can be carried into and out of the water chamber 2A via the narrow manhole 5 without being disassembled, and the preparation time spent in the water chamber 2A and the withdrawal time can be greatly reduced.

Further, the working device 24 is provided with the insertion guide body 40 supporting the flaw detection probe 13 and inner nozzle 24 for movement and said insertion guide body 40 is rotatably installed between the push-in position and the standby position; therefore, the cleaning brush 12, flaw detection probe 13 and inner nozzle 24 can be pushed into a narrow tube 3 in two stages, thereby making it possible to shorten the stroke of the push-in cylinder device 38 and make the working device 24 compact.

Further, the binding ring assembly 43 composed of alternating elastic rings 43a and spacer rings 43b is disposed on the inner nozzle 23 and is compressed for expansion in a narrow tube 3, so that by the second wedge action in which the elastic rings 43a enter the spaces between the spacer rings 43b and the inner surface of the narrow tube 3, the working device 24 can be firmly fixed to the narrow tube 3, and such fixing can be quickly and reliably canceled.

Further, cleaning brushes 12 successively fed to the robot 21 from the brush supplying device 14 through the brush feed hose 54 are received by the brush supplying tool 51 of the brush distributing device 28 and the brush holder 56 of the supplying arm device 53 is adapted to be revolved and extended and contracted so as to deliver cleaning brushes 12 to the brush distributing positions b through e. Therefore, as compared with the arrangement for feeding cleaning brushes 12 directly into the individual working devices 24, the robot 11 can be reduced in size and made compact.

Further, in the working device 24, while the flaw detection probe 13 is being moved by the probe inserting mechanism and probe returning mechanism, the narrow tube 3 just after being cleaned is inspected by the flaw detection probe 13; therefore, the data on the inspection of the narrow tube 3 just after being cleaned can be obtained in real time, greatly increasing the operating efficiency.

Since the flaw detection probe 13 is moved under pressure together with and behind the clearing brush 12 by means of cleaning water, the probe returning mechanism can be used as a cleaning mechanism for cleaning brushes 12, making it possible to make the working devices 24 compact in size. Further, since the inspection cables 30 connected to the flaw detection probes 13 are spirally wound respectively on thin take-up reels 62, the code reel device 29 can be reduced in thickness and the robot body 21 can be made compact. Further, the inspection cables 30 can be reliably wound or paid out and the paid-out amount of the text cable 30 (the position of the inspection probe) can be correctly found from the angle of rotation of the take-up reel 62; thus, the inspection using the flaw detection probe 13 can be smoothly conducted.

Further, in operating the robot 11, when one combined-use arm, e.g., the second combined-use arm 22B, is released from the narrow tube 3, the arm extending and contracting cylinder device 26 and arm turning motor 25 of the first combined-use arm 22A, which is that one of the remaining three, i.e., the first, third and fourth, combined-use arms 22A, 22C and 22D fixed to the narrow tubes 3, whose front end is positioned in the uppermost region, are respectively drive-controlled and the arm extending and contracting cylinder device 26 and the arm turning motor 25 of one of the other, i.e., the third and fourth, combined-use arms 22C and 22C are drive-controlled while rendering the other free, whereby without overloading the narrow tubes 3 to which the three, i.e., the first, third and fourth, combined-use arms 22A, 22C and 22D are fixed, the robot body 21 can be accurately positioned, thus preventing failure or damage in or to the narrow tubes 3 and robot 11.

Further, in selecting the drive system which performs drive control, draw median lines La and Lb from the front end of the selected uppermost, e.g., the first, combined-use arm 22A through the centers of turning movement (output shafts 25a) of the other two, i.e., the third and fourth, combined-use arms 22C and 22D. In the case where the third and fourth combined-use arms 22C and 22D are located within the range of a predetermined angle α=45° on the opposite sides of each of the median lines La and Lb, the arm extending and contracting cylinders 26 are rendered free while drive-controlling the arm turning motors 25, whereby the drive system associated with the side where the turning moment imposed on the robot body 21 around the front end of the first combined-use arm 22A is easier to support can be selected and drive-controlled, so that the robot body 21 can be held in the correct position.

Further, one of the first through fourth combined-use arms 22A through 22D is moved and then stopped opposed to a narrow tube 3 and when the cleaning brush 12 is to be inserted into the narrow tube 3, the arm extending and contracting cylinder device 26 and arm turning motor 25 of said combined-use arm are rendered temporarily free, whereby the positional deviation can be accommodated, so that the cleaning brush 12, flaw detection probe 13 and inner nozzle 23 can be reliably inserted into the narrow tube 3.

Further, when the working reference position of the robot body 11 is set at a position spaced a predetermined distance from the tube sheet 4 and one, e.g. the second, combined-use arm 22B is released from the narrow tube 3 and is moved to the next narrow tube 3 and positioned, the pressing cylinder devices 34 of the other three, i.e., the first, third and fourth, combined-use arms 22A, 22C and 22D are driven to move the robot body 21 until it is close to the tube sheet 4. Thereby, the release of the second combined-use arm 22B makes it possible to correct the attitude displacement in an amount by which the robot body 21 is spaced from the tube sheet 4, and bring the pressing nozzle 41 close to the narrow tube 3. Thus, the cleaning brush 12, flaw detection probe 13 and inner nozzle 23 can be reliably inserted into the narrow tube 3 through the pressing port 41a.

Further, the working reference position for the first through fourth combined-use arms 22A through 22D is set at a position where the robot body 21 is closest to the tube sheet 4, and the limit of projection to which the push-in nozzle 41 is projected by the pressing cylinder device 34 is set such that the limit position is spaced a predetermined distance from the working reference position toward the narrow tube 3. And when one, e.g., the second, combined-use arm 22B is released from the narrow tube 3 and is moved to the next narrow tube 3 and positioned, the push-in nozzle 41 is moved to the limit of projection by the pressing cylinder device 34, whereby the attitude displacement in an amount by which the robot body 21 is spaced from the tube sheet 4 can be corrected to allow the push-in nozzle 41 to approach the narrow tube 3; thus, the cleaning brush 12, flaw detection probe 13 and the inner nozzle 23 can be reliably inserted into the narrow tube 3.

(Other Embodiments)

In the above embodiment, the four, first through fourth, combined-use arms 22A through 22D have been provided. However, five or six combined-use arms may be provided. In this case, three combined-use arms are used to position and fix the robot body while the remaining combined-use arms are released from the narrow tubes 3 for working.

Further, although the subject of work has been the condenser 1, it may be some other heat exchanger.

Further, although the medium for the distributive transfer and pressure feed of the cleaning brushes 12 has been cleaning water, it may be compressed air.

Further, said working robot has been equipped with the cleaning function and the probe insertion test means; however, the robot may be equipped with the cleaning function alone or the probe insertion test means alone. In the case where it is equipped with the probe insertion test means alone, it may be used exclusively for flaw detection in narrow steam tubes of a less-contaminated heat exchanger or the narrow tubes of a condenser already cleaned by a different cleaning device or a worker.

Industrial Applicability

As has been described so far, the working robot for heat exchangers according to the present invention is adapted for use for heat exchangers having a number of narrow tubes and adapted to be carried into the water chamber through a narrow manhole to automatically effect efficient cleaning and inspection of narrow tubes.

What is claimed is:

1. A working robot for heat exchangers comprising:
   a robot body movable along a tube sheet through which a number of narrow tubes open,
   at least four combined-use arms mounted on an outer periphery of said robot body for extension and retraction toward and away from the outer periphery along said tube sheet, and
   a working device installed at a front end of each of said combined-use arms,
   said working device being provided with
   a cleaning means consisting essentially of a cleaning tool inserting mechanism for inserting a cleaning tool into a narrow tube and a pressure-feed mechanism for moving said cleaning tool in and along a narrow tube by pressurized fluid, and
   a positioning mechanism for inserting a connecting and fixing tool into a narrow tube to fix said combined-used arm to the narrow tube to position the robot body,
   said robot including a movement mechanism for moving the robot body by extending and retracting the combined-use arms fixed by said positioning mechanism.

2. A working robot for heat exchangers as set forth in claim 1, wherein a base end of each combined-use arm is installed for turning movement around an axis perpendicular to the tube sheet, and said combined-use arm is configured for extension and contraction.

3. A working robot for heat exchangers as set forth in any one of claim 1, wherein
   the positioning mechanism for the working device is provided with a push-in driving device for inserting the connecting and fixing tool into a narrow tube,
   said connecting and fixing tool being provided with an inner sleeve member disposed on the front end side, a binding ring assembly fitted on said inner sleeve member and prevented from slipping off at the front end, a push-in sleeve slidably fitted on a base end of the binding ring assembly in the inner sleeve member and adapted to be driven for extension and retraction by said push-in driving device, and a locking member for preventing the insertion of the inner sleeve member at the position where said binding ring assembly has been inserted into a narrow tube,
   said binding ring assembly comprising alternating elastic rings and spacer rings,
   said working robot being thus configured such that with the insertion of the inner sleeve member into a narrow tube being prevented by said locking member, the push-in driving device drives the push-in sleeve toward the front end to compress said binding ring assembly, and the connecting and fixing tool is fixed in the narrow tube by the expansion of the elastic rings.

4. A working robot for heat exchangers as set forth in claim 1, wherein the robot body is provided with a cleaning tool distributing device for delivering cleaning tools successively to the working positions of the combined-use arms,
   said cleaning tool distributing device being provided with a supplying arm device which moves said cleaning tool holder between a supplying position where said cleaning tools are fed in and a distributing position where said cleaning tools are delivered to the working devices of the combined-use arms, as a revolving arm having a cleaning tool holder at the front end thereof is turned around the robot axis which is perpendicular to the tube sheet.

5. A working robot for heat exchangers comprising:
   a robot body movable along a tube sheet through which a number of narrow tubes open,
   at least four combined-use arms mounted on an outer periphery of said robot body for extension and retraction toward and away from the outer periphery along said tube sheet, and
   a working device installed at a front end of each of said combined-use arms,
   said working device being provided with
   a position mechanism for inserting a connecting and fixing tool into a narrow tube to fix said combined-used arm to the narrow tube to position the robot body, and
   a probe inserting mechanism for inserting an inspection probe into a narrow tube and a pressure-feed mechanism for pressure-moving said inserted inspection probe along a narrow tube by pressurized fluid,
   said robot including
   a movement mechanism for moving the robot body by extending and retracting the combined-use arms fixed by said positioning mechanism, and a narrow tube inspecting mean for inspecting the narrow tube by said inspection probe moved in said narrow tube.

6. A working robot for heat exchangers as set forth in claim 5, wherein said working device is provided with
   a cleaning means consisting essentially of a cleaning tool inserting mechanism for inserting a cleaning tool into a narrow tube and a pressure-feed mechanism for moving said cleaning tool in and along the narrow tube by pressurized fluid, and
   a narrow tube inspecting means for inspecting the narrow tube by said inspection probe being moved in said narrow tube.

7. A working robot for heat exchangers as set forth in any one of claims 1 through 6, wherein at least three but not all of the at least four combined-use arms have their front ends fixed to narrow tubes by the positioning mechanisms of the working devices, in which state these combined-use arms are driven to move the robot body, and the remaining one or more combined-use arms are released from the narrow tubes to move their working devices to the next narrow tubes.

8. A working robot for heat exchangers as set forth in claim 6, wherein a base end of each combined-used arm is installed for turning movement around an axis perpendicular to the tube sheet, and said combined-use arm is configured for extension and contraction.

9. A working robot for heat exchangers as set forth in any one of claims 2 through 8, wherein the outer periphery of the robot body is formed with storage spaces for receiving the combined-use arms such that when the combined-use arms are retracted for contraction and received in the storage spaces, the entire robot assumes a cylindrical form which enables the robot to pass through a manhole.

10. A working robot for heat exchangers as set forth in claim 6, wherein the working device is provided with an insertion guide body for supporting the inspection probe and connecting and fixing tool for movement toward a push-in nozzle opposed to a narrow tube, said insertion guide body being adapted for movement between a push-in position on the axis of said push-in nozzle and a standby position shifted from said push-in position, and wherein the cleaning tool inserting mechanism and probe inserting mechanism are provided with a push-in driving device, and when the insertion guide body is moved to the standby position, the cleaning tool inserted in the push-in position is inserted into a narrow tube through said push-in nozzle, and the inspection probe and connecting and fixing tool are inserted into the narrow tube through said push-in nozzle from the insertion guide body moved from the standby position to the push-in position.

11. A working robot for heat exchangers as set forth in claim 6, wherein the robot includes a probe returning mechanism for returning the inspection probe to the working device after the inspection probe has been moved through the narrow tube, and a narrow tube inspecting mechanism for inspecting the narrow tube when the inspection probe is moving along at least one of its forward and return paths.

12. A working robot for heat exchangers as set forth in claim 5, wherein a base end for each combined-use arm is installed for turning movement around an axis perpendicular to the tube sheet, and said combined-use arm is configured for extension and contraction.

13. A working robot for heat exchangers as set forth in claim 5, wherein the robot includes a probe returning mechanism for returning the inspection probe to the working device after the inspection probe has been moved through the narrow tube, and a narrow tube inspecting mechanism for inspecting the narrow tube when the inspection probe is moving along at least one of its forward and return paths.

14. A working robot for heat exchangers as set forth in claim 13 or 11, wherein the probe inserting mechanism is arranged to pressure-feed the inspection probe together with and behind the cleaning tool by means of pressurized fluid from the pressure-feed mechanism, and the probe returning mechanism is constituted by a code reel device capable of winding and paying out an inspection cable connected to the inspection probe, said code reel device being provided with a take-up reel for each inspection probe of the working device for spirally winding the inspection cable.

15. A method of operating a working robot for heat exchangers, wherein
the robot body is movably disposed on a horizontal tube sheet through which a number of narrow tubes open, and
the robot body is provided with four combined-use arm installed to be able to extend and contract and turn at their base ends around their respective axes perpendicular to the tube sheet, and wherein
in the state in which the robot body is positioned in such a manner that all or three of these four combined-use arms have their connecting and fixing tools inserted into narrow tubes from their working devices at their front ends and fixed therein,
out of eight drive systems consisting essentially of the arm extending and contracting devices and arm turning devices of the four combined-use arms fixed to said narrow tubes, or out of six drive systems consisting essentially of the arm extending and contracting devices and arm turning devices of the three combined-use arms,
at least three but not all are drive-controlled, and
in the state in which the remaining one or more drive systems are rendered free to be capable of following said drive-controlled drive systems,
the robot body is positioned and fixed, and moved along the tube sheet.

16. A method of operating a working robot for heat exchangers, wherein
the robot body is movably disposed on an inclined or vertical tube sheet through which a number of narrow tubes open, and
the robot body is provided with four combined-use arm installed to be able to extend and contract and turn at their base ends around their respective axes perpendicular to the tube sheet, and wherein
in the state in which the robot body is positioned in such a manner that all or three of these four combined-use arms have their connecting and fixing tools inserted into narrow tubes from their working devices at their front ends and fixed therein,
out of eight drive systems consisting essentially of the arm extending and contracting devices and arm turning devices of the four combined-use arms, or out of six drive systems consisting essentially of the arm extending and contracting devices and arm turning devices of the three combined-use arms,
two drive systems that are the arm extending and contracting device and the arm turning motor of the combined-use arm whose front end is positioned in the uppermost region are respectively drive-controlled,
at least one of the other drive systems of the combined-use arm is drive-controlled, and
the remaining drive system or systems are rendered free to be capable of following said drive-controlled drive systems.

17. A method of operating a working robot for heat exchangers as set forth in claim 16, wherein
in the combined-use arms except the one whose front end is positioned in the uppermost region and whose drive systems are drive-controlled,
median lines are drawn from the connecting and fixing tool on the front end of the uppermost combined-use arm through the centers of turning movement of the other combined-use arms, and
in the case where a combined-use arm to be drive-controlled is present in a predetermined range of angle on either side of each of the median lines from these centers of turning movement, the arm turning device of said combined-use arm is drive-controlled while the arm extending and contracting device is rendered free to be capable of following the drive system which is drive-controlled, or
in the case where a combined-use arm to be drive-controlled is present outside said predetermined range of angle on either side of the median lines from these centers of turning movement, the arm turning device is rendered free to be capable of following the drive system which is drive-controlled.

18. A method of operating a working robot for heat exchangers, wherein
the robot body is movably disposed on a tube sheet through which a number of narrow tubes open,
the robot body is provided with four combined-use arms installed such that they can be extended and contracted and can be turned at their base ends around their respective axes perpendicular to the tube sheet,
three of these four combined-use arms are fixed in position by inserting their connecting and fixing tools into narrow tubes from working devices at the front ends of the combined-use arms, thereby positioning the robot body, in this state, the remaining combined-use arm is moved and the working devices are stopped at positions where they are opposed to narrow tubes, and both drive systems respectively consisting essentially of an arm extending and contracting device for extending and contracting the combined-use arm and an arm turning device for turning the combined-use arm are temporarily rendered free to follow the load, whereupon a first insertion member is inserted into the narrow tube from the working device.

19. A method of operating a working robot for heat exchangers, wherein the robot body is movably disposed on a tube sheet through which a number of narrow tubes open, at least three of four combined-use arms installed on the robot body such that they can be extended and contracted and can be turned at their base ends around their respective axes perpendicular to the tube sheet by inserting their connecting and fixing tools into narrow tubes from working devices on their respective front ends through push-in nozzles and are fixed therein, thereby positioning the robot body, a working reference position of the robot body is set at a position spaced a predetermined distance from the tube sheet by push-in driving devices installed on the combined-use arms such that said working devices can be extended and contracted with respect to the tube sheet, when the working device of one combined-use arm is released from a treated narrow tube and moved to and positioned at the next narrow tube, the pressing and driving devices of the other three combined-use arms are driven to move the robot body until it is close to the tube sheet, thereby correcting the displacement in an amount by which the portion of the robot body associated with the combined-use arm is spaced from the tube sheet by the release of the connecting and fixing tool of said combined-use arm in order for bringing the push-in nozzle of this combined-use arm close to the narrow tube, and after a cleaning brush and the connecting and fixing tool are inserted into the narrow tube from the working device of the combined-use arm through the push-in nozzle to fix this combined-use arm to the narrow tube, the pressing and driving devices of all combined-use arms are driven to retract the robot body to said working reference position.

20. A method of operating a working robot for heat exchangers, wherein the robot body is movably disposed on a tube sheet through which a number of narrow tubes open, at least three of four combined-used arms installed on the robot body such that they are extendable and contractible and turnable have their connecting and fixing tools inserted into narrow tubes from working devices on their respective front ends through push-in nozzles and are fixed therein, thereby positioning the robot body, a working reference position of the robot body is set at a position closest to the tube sheet by push-in driving devices installed on the combined-use arms such that said working devices can be extended and contracted with respect to the tube sheet, the limit of projection to which the push-in nozzle is projected by the push-in driving device being such that the limit position is spaced a predetermined distance from the working reference position toward the narrow tubes, when the working device of one combined-used arm is released from a treated narrow tube and moved to and positioned at the next narrow tube, the pressing and driving device of this combined-use arm is driven to move the push-in nozzle to the limit of projection close to the narrow tube, thereby correcting an amount by which the portion of the robot body associated with the combined-use arm is displaced from the tube sheet by the release of the connecting and fixing tool of said combined-use arm in order for bringing the push-in nozzle close to the narrow tube, and after the connecting and fixing tool has been fixed in the narrow tube by being inserted thereinto from the working device through the push-in nozzle, the pressing and driving device of said combined-use arm is driven to retract the robot body to said working reference position.

\* \* \* \* \*